(12) United States Patent
Ito

(10) Patent No.: US 10,804,532 B2
(45) Date of Patent: Oct. 13, 2020

(54) NEGATIVE-ELECTRODE ACTIVE MATERIAL, METHOD OF MANUFACTURING THE SAME, AND NONAQUEOUS SECONDARY BATTERY

(71) Applicant: MURATA MANUFACTURING CO., LTD., Kyoto (JP)

(72) Inventor: Daisuke Ito, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/274,841

(22) Filed: Feb. 13, 2019

(65) Prior Publication Data

US 2019/0181433 A1  Jun. 13, 2019

Related U.S. Application Data

(63) Continuation of application No. PCT/JP2017/021510, filed on Jun. 9, 2017.

(30) Foreign Application Priority Data

Aug. 16, 2016 (JP) ................... 2016-159532

(51) Int. Cl.
*H01B 1/06* (2006.01)
*H01M 4/36* (2006.01)
(Continued)

(52) U.S. Cl.
CPC ............. *H01M 4/364* (2013.01); *H01B 1/06* (2013.01); *H01M 4/045* (2013.01); *H01M 4/0471* (2013.01); *H01M 4/131* (2013.01);
*H01M 4/134* (2013.01); *H01M 4/1391* (2013.01); *H01M 4/1395* (2013.01); *H01M 4/36* (2013.01);
(Continued)

(58) Field of Classification Search
CPC .. H01B 1/00; H01B 1/04; H01B 1/08; H01M 4/36; H01M 4/38; H01M 4/48
See application file for complete search history.

(56) References Cited

U.S. PATENT DOCUMENTS 10,164,248 B2 * 12/2018 Ito .................. H01M 4/1395
2008/0076017 A1   3/2008 Takezawa et al.
(Continued)

FOREIGN PATENT DOCUMENTS

| JP | 2007-087940 | 4/2007 |
| JP | 2014-116306 | 6/2014 |

(Continued)

OTHER PUBLICATIONS

Deng et al "A core-shell Si@NiSi2/Ni/C nanocomposite as an anode material for lithium-ion batteries", Electrochemica Acta 192 (2016) 303-309.*

(Continued)

*Primary Examiner* — Mark Kopec
(74) *Attorney, Agent, or Firm* — K&L Gates LLP

(57) ABSTRACT

A negative-electrode active material is provided. The negative-electrode active material includes a particle including a core and a coat layer provided on at least a part of a surface of the core. The core includes a first nickel silicide-based material and a silicon oxide-based material, and the coat layer includes a second nickel silicate-based material.

15 Claims, 9 Drawing Sheets

(51) Int. Cl.

| | | |
|---|---|---|
| *H01M 4/38* | (2006.01) | |
| *H01M 4/48* | (2010.01) | |
| *H01M 4/04* | (2006.01) | |
| *H01M 4/131* | (2010.01) | |
| *H01M 4/134* | (2010.01) | |
| *H01M 4/1391* | (2010.01) | |
| *H01M 4/1395* | (2010.01) | |
| *H01M 10/0525* | (2010.01) | |
| *H01M 4/02* | (2006.01) | |

(52) U.S. Cl.
CPC ............... *H01M 4/38* (2013.01); *H01M 4/48* (2013.01); *H01M 10/0525* (2013.01); *H01M 2004/027* (2013.01); *H01M 2220/20* (2013.01); *H01M 2220/30* (2013.01)

(56) References Cited

U.S. PATENT DOCUMENTS

| | | |
|---|---|---|
| 2012/0326500 A1 | 12/2012 | Hirose et al. |
| 2012/0328915 A1 | 12/2012 | Hirose et al. |
| 2015/0243972 A1 | 8/2015 | Ito et al. |

FOREIGN PATENT DOCUMENTS

| | | |
|---|---|---|
| JP | 2015162364 A | 9/2015 |
| JP | 2016035940 A | 3/2016 |
| JP | 2016042487 A | 3/2016 |

OTHER PUBLICATIONS

Extended European Search Report dated Feb. 10, 2020 in corresponding European Application No. 17841273.0.

Lund, et al; The Cycling Performance and Surface Passivation Qualities of a Heterogeneous Amorphous $Ni_xSiO_y$/Polycrystalline $NiSi_2$ Core Shell Nanowire used as a Li-Ion Battery Anode; Journal of The Electrochemical Society, 161 (12) A1772-A1776 (2014).

International Search Report for Application No. PCT/JP2017/021510, dated Sep. 5, 2017.

Japanese Office Action dated Nov. 12, 2019 in corresponding Japanese Application No. 2018-534277, (No English language translation provided).

\* cited by examiner

NEGATIVE-ELECTRODE ACTIVE MATERIAL, METHOD OF MANUFACTURING THE SAME, AND NONAQUEOUS SECONDARY BATTERY

CROSS REFERENCE TO RELATED APPLICATIONS

The present application is a continuation of PCT patent application no. PCT/JP2017/021510, filed on Jun. 9, 2017, which claims priority to Japanese patent application no. JP2016-159532 filed on Aug. 16, 2016, the entire contents of which are being incorporated herein by reference.

BACKGROUND

The present disclosure generally relates to a negative-electrode active material, a method of manufacturing the same, and a nonaqueous secondary battery.

In recent years, demands for higher capacity, higher cycle characteristics, and higher load characteristics of lithium ion secondary batteries have grown. The existing negative-electrode active materials made of $SiO_x$-based active materials have found difficulty in sufficiently satisfying these demands. The $SiO_x$-based active materials formed based on disproportionation reaction (disproportionation treatment) normally have a sea-island structure, where silicon fine particles correspond to islands and $SiO_x$ correspond to the sea. Silicon, which is a semiconductor, is originally low in electric conductivity, while $SiO_x$, which is an oxide, is further low in electric conductivity. Therefore, the electric conductivity of the entire negative-electrode active material is very low.

SUMMARY

The present disclosure generally relates to a negative-electrode active material, a method of manufacturing the same, and a nonaqueous secondary battery.

In the conventional technology, however, only coating of the surfaces of silicon oxide particles with a metal oxide coat is not expected to greatly improve the electric conductivity, and resultantly, it is difficult to obtain a negative-electrode active material sufficiently satisfying the high-speed charge/discharge characteristics and the cycle characteristics.

Also, in general, the adhesion of silicon and silicon oxide to a carbon coat is low. Therefore, in a lithium ion secondary battery that repeats charge/discharge at a volume expansion/contraction rate of 150% or more, peeling off of the carbon coat advances with the progress of the charge/discharge cycles. As a result, problems such as rise in interface impedance and reduction in charge/discharge efficiency occur.

Accordingly, an aspect of the present disclosure are improving the conductive property and structure stability of an active material that satisfies high-speed charge/discharge characteristics and cycle characteristics and has the sea-island structure, and providing a negative-electrode active material having a peeling-resistant surface-stabilized structure, a method of manufacturing the same, and a nonaqueous secondary battery including a negative electrode having such a negative-electrode active material.

According to an embodiment of the present technology, a negative-electrode active material is provided. The negative-electrode active material includes a particle including:

a core; and
a coat layer provided on at least a part of a surface of the core,
wherein the core includes a first nickel silicide-based material and a silicon oxide-based material, and
wherein the coat layer includes a second nickel silicate-based material.

According to an embodiment of the present technology, a nonaqueous secondary battery is provided. The nonaqueous secondary battery includes a negative electrode having a negative-electrode active material. The negative-electrode active material includes a particle including:

a core, and
a coat layer provided on at least a part of the surface of the core,
wherein the core includes a first nickel silicide-based material and a silicon oxide-based material, and
wherein the coat layer includes a second nickel silicate-based material.

According to an embodiment of the present technology, a method of manufacturing a negative-electrode active material is provided. The negative-electrode active material includes a particle including a core; and a coat layer provided on at least a part of a surface of the core, wherein the core includes a first nickel silicide-based material and a silicon oxide-based material, and wherein the coat layer includes a second nickel silicate-based material, wherein the method includes mixing a solution including nickel and a silicon oxide particle, drying the mixture, and performing heat-treatment to the mixture in a reduction atmosphere.

In the negative-electrode active material of the present disclosure, the negative-electrode active material including the negative electrode used in the nonaqueous secondary battery of the present disclosure, and the negative-electrode active material obtained by the method of manufacturing a negative-electrode active material of the present disclosure, the coat layer includes a nickel silicate-based material. Therefore, metal ions (e.g., lithium ions) easily enter and leave the inside of the negative-electrode active material, and can protect the core reliably. Also, the core includes a nickel silicide-based material, which has high electric conductivity. From the above results, the nonaqueous secondary battery having such a negative-electrode active material has high load characteristics, excellent discharge rate characteristics and cycle characteristics, and permits high-speed charge/discharge. Moreover, since the negative-electrode active material of the present disclosure has a surface-stabilized structure and the coat layer is resistant to peeling off from the core, it is possible to improve the conductive property and structure stability of the negative-electrode active material. The nonaqueous secondary battery having such a negative-electrode active material has high long-term reliability. It should be understood that the advantages described in this application are merely illustrative and by no means restrictive and other suitable properties relating to the present technology may be realized and as further described.

DETAILED DESCRIPTION

Figure 1:
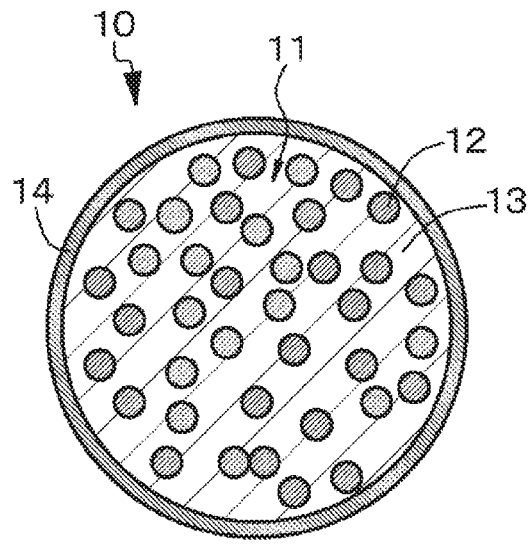
FIG. 1 is a conceptual view showing a cross section of a negative-electrode active material according to an embodiment of the present technology.

As described herein, the present disclosure will be described based on examples with reference to the drawings, but the present disclosure is not to be considered limited to the examples, and various numerical values and materials in the examples are considered by way of example.

In the method of manufacturing a negative-electrode active material of the present disclosure, the solution containing nickel preferably contains nickel acetate salt. However, the method is not limited to this form, but any material containing nickel (e.g., nickel carbonate, nickel nitride, and nickel sulfate) can be used as far as it can be prepared as a solution.

In the method of manufacturing a negative-electrode active material of the present disclosure including the above preferred form, the heat-treatment can be performed at 600° C. to 1000° C. for one hour or longer. Also, in the method of manufacturing a negative-electrode active material of the present disclosure including the above preferred forms, the reduction atmosphere is preferably an inactive gas atmosphere containing hydrogen gas, but it is not limited to this. The reduction atmosphere can be an inactive gas atmosphere such as a nitrogen gas atmosphere and an argon gas atmosphere.

In the negative-electrode active material of the present disclosure, the negative-electrode active material constituting the negative electrode used in the nonaqueous secondary battery of the present disclosure, and the negative-electrode active material obtained by the method of manufacturing a negative-electrode active material of the present disclosure (hereinafter these negative-electrode active materials may sometimes be collectively called "the negative-electrode active materials of the present disclosure"), A first nickel silicide-based material constituting the core can include $Ni_XSi$ (where $0<X\leq2$, nickel silicide), A silicon oxide-based material constituting the core can include $Ni_YSiO_Z$ (where $0<Y<1$, $0<Z<3$), and A second nickel silicate-based material constituting the coat layer can include $Ni_USiO_V$ (where $1\leq U\leq2$, $3\leq V\leq4$).

In the negative-electrode active materials of the present disclosure including the above preferred form,
the core can have a sea-island structure,
the first nickel silicide-based material can correspond to the island of the sea-island structure, and
the silicon oxide-based material can correspond to the sea of the sea-island structure.

Moreover, in the negative-electrode active materials of the present disclosure including the above preferred forms, the coat layer can coat an entire surface of the core.

Further, the negative-electrode active materials of the present disclosure including the above preferred forms can be a negative-electrode active material for a nonaqueous secondary battery, more specifically, a negative-electrode active material constituting a negative electrode of a nonaqueous secondary battery such as a lithium ion secondary battery.

Further, in the negative-electrode active materials of the present disclosure including the above preferred forms, the nickel silicide-based material takes up desirably 10 parts by mass to 90 parts by mass, preferably 30 parts by mass to 70 parts by mass, with respect to 100 parts by mass of the core.

Further, in the negative-electrode active materials of the present disclosure including the above preferred forms, the core takes up desirably 50 parts by mass to 99.9 parts by mass, preferably 90 parts by mass to 99.9 parts by mass, with respect to 100 parts by mass of the negative-electrode active material.

Whether or not the negative-electrode active material contains the above elements can be confirmed by an X-ray photoelectron spectroscopy (XPS) method. Using JPS9010 manufactured by JEOL Ltd. as an XPS apparatus, measurement is performed in wide scan and narrow scan (Si2p, Ni2p, O1s, C1s), all peaks are corrected with C s 248.6 eV, and background removal and peak fitting are performed, whereby the bonding state can be analyzed. Also, in an X-ray diffraction method, Bruker D8 Advance is used to perform 2θ-θ scan.

Further, in the negative-electrode active materials of the present disclosure including the above preferred forms, on the uppermost surface of the negative-electrode active material, at least one kind of material layer selected from the group consisting of carbon, hydroxides, oxides, carbides, nitrides, fluorides, hydrocarbon molecules, and organic polymer molecules can be formed. In this case, the material layer can take up 0.1 mass % to 10 mass %. Examples of the hydroxides include lithium hydroxide and nickel hydroxide. Examples of the oxides include lithium oxide, nickel oxide, zirconium oxide, titanium oxide, nickel silicate, lithium silicate, iron silicate, aluminum oxide, aluminum silicate, lithium carbonate, lithium phosphate, magnesium phosphate, aluminum phosphate, and nickel carbonate. Examples of the carbides include silicon carbide, carbon, graphite, and silicate carbide. Examples of the nitrides include silicon nitride, aluminum nitride, silicon acid nitride, and lithium phosphate nitride. Examples of the fluorides include lithium fluoride, magnesium fluoride, aluminum fluoride, and silicon fluoride. Examples of the hydrocarbons include naphthalene, anthracene, pentacene, oleic acid, and stearic acid. Examples of the organic polymer molecules include polyvinylidene fluoride, styrene butadiene rubber, polyvinyl fluoride, polyimide, polyacrylic acid, polyacrylonitrile, carboxymethyl cellulose, polyvinyl chloride, and polyvinyl pyrrolidone.

The negative-electrode active materials of the present disclosure including the above preferred forms can also be used as conductive particles. Specifically, they can be applied to a conductive layer, an antistatic layer, an electromagnetic shield, an interconnection, an electrode, and a conductive ink, for example. The conductive layer can be applied to an electronic component, an electronic apparatus, a photoelectric conversion element, and a battery, for example. The conductive layer may be patterned into a predetermined shape. Examples of a conductive layer having a predetermined shape include interconnections and electrodes. Examples of the electronic component include an imaging device package, an imaging module, and an electronic component having a micro-wiring circuit. Examples of the electronic component having a micro-wiring circuit include a digital micromirror device (DMD), a semiconductor device such as RAM and ROM, CCD and CMOS imaging devices, and an input device such as a touch panel. Examples of the electronic apparatus include a personal computer, a mobile phone, a tablet-type computer, a display, and an imaging apparatus. Examples of the display include a liquid crystal display (LCD), a plasma display (PDP), an organic electroluminescence (EL) display, an inorganic EL display, an LED display, a field emission display (FED), a surface-conduction electron-emitter display (SED), and an electronic paper. Examples of the imaging apparatus include a digital camera and digital video camera.

Alternatively, using the negative-electrode active material of the present disclosure as conductive particles, a conductive particle layer made of the conductive particles can be formed on the surface of a base material. Examples of the base material include an inorganic base material constituted by glass, metal, metal oxide, etc. or an organic base material constituted by plastic, etc.

The negative-electrode active material of the present disclosure is in the form of particles, which may be primary particles or secondary particles. Examples of the shape of the particles may include, but are not limited to, a spherical shape, an ellipsoidal body shape, a needle shape, a plate shape, a scale shape, a tubular shape, a wire shape, a rod shape, and an amorphous shape. Particles having two or more kinds of shapes may be combined and used. The spherical shape includes, not only a complete spherical shape, but also a shape slightly flattened or distorted from the complete sphere, a shape having asperities on the surface of the complete sphere, or a shape of a combination of these shapes. The ellipsoidal body shape includes, not only a strict ellipsoidal body shape, but also a shape slightly flattened or distorted from the strict ellipsoidal body, a shape having asperities on the surface of the strict ellipsoidal body, or a shape of a combination of these shapes. The diameter of the negative-electrode active material of the present disclosure when the particles of the negative-electrode active material are a complete sphere, or a diameter $d_{50}$ of the negative-electrode active material as being assumed to be a complete sphere when the particles of the negative-electrode active material are not a complete sphere, can be presented as $1 \times 10^{-8}$ m to $5 \times 10^{-5}$ m, for example.

The silicon oxide-based material constituting the core has non-crystallinity (is in an amorphous state) or low crystallinity. The nickel silicide-based material constituting the core has crystallinity. The nickel silicate-based material constituting the coat layer has non-crystallinity (is in an amorphous state) or low crystallinity. With the silicon oxide-based material constituting the core having non-crystallinity (being in an amorphous state) or low crystallinity, it is easy to relax distortion due to the expansion/contraction of the negative-electrode active material even during charge/discharge cycles that accompany a great volume change, whereby the cycle characteristics of the nonaqueous secondary battery can be improved. Also, with the nickel silicate-based material constituting the coat layer having non-crystallinity (being in an amorphous state) or low crystallinity, it is possible to prevent or reduce occurrence of cracking of the coat layer caused by distortion due to the volume expansion/contraction.

Formation of a lithium ion secondary battery from the nonaqueous secondary battery of the present disclosure will be described hereinafter.

In the lithium ion secondary battery of the present disclosure, examples of a positive-electrode active material capable of occluding and releasing lithium may include a lithium-containing composite oxide, a lithium-containing phosphate compound, a lithium-containing sulfide, or a lithium-containing compound such as an interlayer compound containing lithium, two or more kinds of which may be combined and used. To state differently, as the positive-electrode active material, a lithium-containing compound (compound containing lithium atoms) can be used, and, from the standpoint of obtaining a high energy density, a lithium-containing composite oxide and a lithium-containing phosphate compound are preferably used. The lithium-containing composite oxide is an oxide containing lithium and one element or two or more elements (hereinafter referred to as "another element" or "other elements," which exclude lithium) as component elements, and has a bedded salt type crystalline structure or a spinel type crystalline structure. Specific examples of such an oxide include a lithium-cobalt-based material, a lithium-nickel-based material, a spinel manganese-based material, and a superlattice structure material. The lithium-containing phosphate compound is a phosphate compound containing lithium and one element or two or more elements (another element or other elements) as component elements, and has an olivine type crystalline structure. Otherwise, to enhance the energy density, a lithium-containing compound containing lithium, a transition metal element, and oxygen (O) is preferable. Examples of such a lithium-containing compound include a lithium composite oxide having a bedded salt type structure expressed in formula (A) and a lithium composite phosphate having an olivine type structure expressed in formula (B). It is more preferable to include, as the transition metal element in the lithium-containing compound, at least one kind selected from the group consisting of cobalt (Co), nickel (Ni), manganese (Mn), and iron (Fe). Examples of such a lithium-containing compound include a lithium composite oxide having a bedded salt type structure expressed in formula (C), (D), or (E), a lithium composite oxide having a spinel type structure expressed in formula (F), and a lithium composite phosphate having an olivine type structure expressed in formula (G). Specifically, they are $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), etc.

$$Li_pNi_{(1-q-r)}Mn_qM^1_rO_{(2-y)}X_z \quad (A)$$

In formula (A), $M^1$ denotes at least one kind selected from the elements in Groups 2 to 15 except for nickel (Ni) and manganese (Mn), X denotes at least one kind selected from the elements in Groups 16 and 17 except for oxygen (O), and p, q, y, and z are respectively values within the ranges of 0≤p≤1.5, 0≤q≤1.0, 0≤r≤1.0, −0.10≤y≤0.20, and 0≤z≤0.2.

$$Li_aM^2_bPO_4 \quad (B)$$

In formula (B), $M^2$ denotes at least one kind selected from the elements in Groups 2 to 15, and a and b are respectively values within the ranges of 0≤a≤2.0 and 0.5≤b≤2.0.

$$Li_jMn_{(1-g-h)}Ni_gM^3_hO_{(2-j)}F_k \quad (C)$$

In formula (C), $M^3$ denotes at least one kind of element selected from the group consisting of cobalt (Co), magnesium (Mg), aluminum (Al), boron (B), titanium (Ti), vanadium (V), chrome (Cr), iron (Fe), copper (Cu), zinc (Zn), zirconium (Zr), molybdenum (Mo), tin (Sn), calcium (Ca), strontium (Sr), and tungsten (W), and f, g, h, j, and k are values within the ranges of 0.8≤f≤1.2, 0<g<0.5, 0≤h≤0.5, (g+h)<1, −0.1≤j≤0.2, and 0≤k≤0.1. The composition expressed by formula (C) varies with the charge/discharge state, where the value of f represents the value in the completely discharged state.

$$Li_mNi_{(1-n)}M^4_nO_{(2-p)}F_q \quad (D)$$

In formula (D), $M^4$ denotes at least one kind of element selected from the group consisting of cobalt (Co), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), and m, n, p, and q are respectively values within the ranges of 0.8≤m≤1.2, 0.005≤n≤0.5, −0.1≤p≤0.2, and 0≤q≤0.1. The composition expressed by formula (D) varies with the charge/discharge state, where the value of m represents the value in the completely discharged state.

$$Li_rCo_{(1-s)}M^5_sO_{(2-t)}F_u \quad (E)$$

In formula (E), $M^5$ denotes at least one kind of element selected from the group consisting of nickel (Ni), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), and r, s, t, and u are respectively values within the ranges of 0.8≤r≤1.2, 0≤s<0.5, −0.1≤t≤0.2, and 0≤u≤0.1. The composition expressed by formula (E) varies with the charge/discharge state, where the value of r represents the value in the completely discharged state.

$$Li_vMn_{2-w}M^6_wO_xF_y \quad (F)$$

In formula (F), $M^6$ denotes at least one kind of element selected from the group consisting of cobalt (Co), nickel (Ni), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), and v, w, x, and y are respectively values within the ranges of 0.9≤v≤1.1, 0≤w≤0.6, 3.7≤x≤4.1, and 0≤y≤0.1. The composition expressed by formula (F) varies with the charge/discharge state, where the value of v represents the value in the completely discharged state.

$$Li_zM^7PO_4 \quad (G)$$

In formula (G), $M^7$ denotes at least one kind of element selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), and z is a value within the range of 0.9≤z≤1.1. The composition expressed by formula (G) varies with the charge/discharge state, where the value of z represents the value in the completely discharged state.

In addition to the above, inorganic compounds containing no lithium, such as $MnO_2$, $V_2O_5$, $V_6O_{13}$, NiS, and MoS, can be used as the positive-electrode active material capable of occluding and releasing lithium, and ones other than the above may also be used. Two or more kinds of the positive-electrode active materials cited above may also be mixed together in an arbitrary combination.

In the negative electrode, a negative-electrode active material layer is formed on one surface or both surfaces of a negative-electrode power collector, for example. Examples of a material constituting the negative-electrode power collector may include copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), an alloy containing any of these metals, and a conductive material such as stainless steel. A negative-electrode lead can be attached to the negative-electrode power collector. The surface of the negative-electrode power collector is preferably roughened from the standpoint of enhancing the adhesion of the negative-electrode active material layer to the negative-electrode power collector based on the so-called anchor effect. In this case, it is only required to roughen at least the surface of a region of the negative-electrode power collector on which the negative-electrode active material layer should be formed. Roughening can be performed by a method of forming fine particles using electrolytic treatment. The electrolytic treatment is a method of providing asperities on the surface of the negative-electrode power collector by forming fine particles on the surface of the negative-electrode power collector in an electrolytic bath using an electrolytic method. The negative-electrode active material layer includes the negative-electrode active material of the present disclosure capable of occluding and releasing lithium. An additive may be included as required in the negative-electrode active material layer. As the additive, a negative-electrode conducting agent or a negative-electrode binding agent, or both the negative-electrode conducting agent and the negative-electrode binding agent can be used, for example.

In the positive-electrode, a positive-electrode active material layer is formed on one surface or both surfaces of a positive-electrode power collector, for example. Examples of a material constituting the positive-electrode power collector may include copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), an alloy containing any of these metals, or a conductive material such as stainless steel. A positive-electrode lead can be attached to the positive-electrode power collector. The positive-electrode active material layer includes a positive-electrode active material capable of occluding and releasing lithium (Li), for example, that is an electrode-reactive material. An additive may be included as required in the positive-electrode active material layer. As the additive, a positive-electrode conducting agent or a positive-electrode binding agent, or both the positive-electrode conducting agent and the positive-electrode binding agent can be used, for example.

The form of the material of the positive-electrode power collector or the negative-electrode power collector can be foil-like, nonwoven fabric-like, net-like, porous sheet-like, rod-like, and plate-like, for example.

Specific examples of the binding agent in the positive electrode and the negative electrode include: synthetic rubbers including styrene-butadiene-based rubber such as styrene-butadiene rubber (SBR), fluorine-based rubber, and ethylene-propylene-diene; fluorine-based resins such as polyvinylidene-fluoride (PVdF), polyvinyl-fluoride, polyimide, polytetrafluoroethylene (PTFE), and ethylenetetrafluoroethylene (ETFE), and copolymers and modifications of these fluorine-based resins; polyolefin-based resins such as polyethylene and polypropylene; acrylic resins such as polyacrylonitrile (PAN) and polyacrylic acid ester; and polymer materials such as carboxymethyl cellulose (CMC), as well as at least one kind selected from copolymers including these resin materials as a main constituent. More specific examples of the copolymer of vinylidene fluoride include a vinylidene fluoride-hexafluoropropylene copolymer, a vinylidene fluoride-tetrafluoroethylene copolymer, a vinylidene fluoride-chlorotrifluoroethylene copolymer, and a vinylidene fluoride-hexafluoropropylene-tetrafluoroethylene copolymer. As the binding agent, a conductive polymer may be used. As the conductive polymer, substituted or non-substituted polyaniline, polypyrrole, and polythiophene, and (co)polymers of one kind or two kinds selected from the above can be used, for example.

Examples of the positive-electrode conducting agent and the negative-electrode conducting agent include carbon materials such as graphite, carbon fibers, carbon black, carbon nanotubes, vapor-grown carbon fibers (VGCF), acetylene black (AB), and Ketjen black (KB). One kind or two or more kinds of the above can be mixed and used. Examples of the carbon nanotubes include single wall carbon nanotubes (SWCNT) and multi-wall carbon nanotubes (MWCNT) such as double wall carbon nanotubes (DWCNT). Otherwise, a metal material, a conductive polymer material, etc. may be used as far as such a material has a conductivity.

The positive-electrode lead can be attached to the positive-electrode power collector based on spot welding or ultrasonic welding. The positive-electrode lead is desirably metal foil or net-like metal, but may not be metal as far as it is stable electrochemically and chemically and conductive. Examples of the material of the positive-electrode lead include aluminum (Al) and nickel (Ni). The negative-electrode lead can also be attached to the negative-electrode power collector based on spot welding or ultrasonic welding. The negative-electrode lead is also desirably metal foil or net-like metal, but may not be metal as far as it is stable electrochemically and chemically and conductive. Examples of the material of the negative-electrode lead include copper (Cu) and nickel (Ni).

The positive-electrode active material layer and the negative-electrode active material layer can be formed based on an application method. That is, they can be formed by a method in which particulate (powdered) positive-electrode or negative-electrode active material is mixed with the positive-electrode binding agent or the negative-electrode binding agent, and the mixture is dispersed in a solvent such as an organic solvent and applied to the positive-electrode or negative-electrode power collector (e.g., an application method using a spray). The application method is not limited to the above, and moreover the method is not limited the application method. For example, the negative-electrode active material of the present disclosure can be molded to obtain the negative electrode, and the positive-electrode active material can be molded to obtain the positive electrode. For molding, a press, for example, may be used.

In order to prevent lithium from depositing on the negative electrode unintentionally in the middle of charging, the chargeable capacity of the negative electrode is preferably greater than the discharge capacity of the positive electrode. That is, the electrochemical equivalent of the negative electrode capable of occluding and releasing lithium is preferably greater than the electrochemical equivalent of the positive electrode. Note that the lithium depositing on the negative electrode is a lithium metal when the electrode-reactive material is lithium, for example.

A separator isolates the positive electrode from the negative electrode, and allows lithium ions to pass therethrough while preventing short-circuiting of a current caused by contact between the positive electrode and the negative electrode. The separator is constituted by: a porous film made of a synthetic resin such as a polyolefin-based resin (polypropylene resin and polyethylene resin), a polyimide resin, a polytetrafluoroethylene resin, and aromatic polyamide; a porous film such as ceramic; glass fibers (including a glass filter, for example); and an unwoven fabric made of liquid crystal polyester fibers, aromatic polyamide fibers, and cellulose-based fibers, for example. Otherwise, a separator constituted by a multilayer film of two or more kinds of porous films, a separator with an inorganic material layer applied thereto, or a separator containing an inorganic material can be used. Among others, a porous film made of a polyolefin-based resin is preferable because it is excellent in short-circuit prevention effect and can achieve improvement in the safety of the battery due to its shutdown effect. The polyethylene resin, which can obtain the shutdown effect at a temperature in the range of 100° C. to 160° C. and is excellent in electrochemical stability, is especially preferable as the material constituting the separator. As another candidate, a material obtained by copolymerizing or blending a resin having chemical stability with polyethylene or polypropylene can be used. Otherwise, the porous film may have a three or more layer structure of a polypropylene layer, a polyethylene layer, and a polypropylene layer stacked sequentially.

The separator may have a structure in which a resin layer is provided on one surface or both surfaces of a porous film as a base material. The resin layer can be a porous matrix resin layer with an inorganic material supported thereto. By employing such a structure, it is possible to obtain oxidation resistance and thus prevent or reduce degradation of the separator. Examples of the material constituting the matrix resin layer include polyvinylidene-fluoride (PVdF), hexafluoropropylene (HFP), and polytetrafluoroethylene (PTFE). A copolymer of these materials can also be used. The inorganic material can be a metal, a semiconductor, or an oxide or a nitride thereof. Examples of the metal may include aluminum (Al) and titanium (Ti), and examples of the semiconductor may include silica (Si) and boron (B). Also, an inorganic material that is substantially nonconductive and large in heat capacity is preferable. An inorganic material having large heat capacity is useful as a heat sink at the time of current heat generation, making it possible to prevent or reduce thermal runaway of the battery further effectively. Examples of such an inorganic material may include oxides and nitrides such as alumina ($Al_2O_3$), boehmite (a hydrate of alumina), talc, boron nitride (BN), aluminum nitride (AlN), titanium dioxide ($TiO_2$), and silicon oxide. The particle size of the inorganic material can be 1 nm to 10 μm. If it is smaller than 1 nm, such a material will be hard to obtain, and, if obtainable, will not be commensurate with the cost. If the particle size is greater than 10 μm, the inter-electrode distance will become great, failing to obtain a sufficient charge amount of the active material in a limited space, resulting in reduction in battery capacity. The inorganic material may be included in the porous film as the base material. The resin layer can be obtained by applying slurry made of a matrix resin, a solvent, and an inorganic material to the base material (porous film), allowing the resultant material to pass through a poor solvent of the matrix resin and a solvent-affinity bath of the solvent to achieve phase separation, and then drying the resultant material.

The thrust strength of the separator can be 100 gf to 1 kgf, preferably 100 gf to 480 gf. If the thrust strength is low, there is a possibility of occurrence of a short. If it is high, there is a possibility of reduction in ion conductivity. The air permeability of the separator can be 30 sec/100 cc to 1000 sec/100 cc, preferably 30 sec/100 cc to 680 sec/100 cc. If the air permeability is excessively low, there is a possibility of occurrence of a short. If it is excessively high, there is a possibility of reduction in ion conductivity.

The separator is impregnated with an electrolytic solution that is a liquid electrolyte. The electrolytic solution includes a solvent and electrolyte salt dissolved in this solvent. The electrolytic solution may also include a known additive for improvement of the battery characteristics.

As the solvent, cyclic carbonates such as ethylene carbonate (EC), propylene carbonate (PC), butylene carbonate (BC) can be used. It is preferable to use either one of ethylene carbonate and propylene carbonate, and further preferable to use both of them in mixture, whereby the cycle characteristics can be improved. Also, from the standpoint of obtaining high ion conductivity, it is possible to use, as the solvent, a mixture of any of such cyclic carbonates with a chain carbonate such as diethyl carbonate, dimethyl carbonate, ethylmethyl carbonate, or methylpropyl carbonate. Otherwise, the solvent may include 2,4-difluoroanisole and vinylene carbonate: 2,4-difluoroanisole can improve the discharge capacity, and vinylene carbonate can improve the cycle characteristics. It is therefore preferable to mix them in the solvent since the discharge capacity and the cycle characteristics can be improved.

Examples of the solvent other than those cited above include: chain carbonates such as dimethyl carbonate (DMC), ethylmethyl carbonate (EMC), diethyl carbonate (DEC), dipropyl carbonate (DPC), propylmethyl carbonate (PMC), propylethyl carbonate (PEC), and fluoroethylene carbonate (FFC); cyclic ethers such as tetrahydrofuran (THF), 2-methyltetrahydrofuran (2-MeTHF), 1,3-dioxolan (DOL), and 4-methyl-1,3-dioxolan (4-MeDOL); chain ethers such as 1,2-dimethoxyethane (DME) and 1,2-diethoxyethane (DEE); cyclic esters such as γ-butyrolactone (GBL) and γ-valerolactone (GVL); and chain esters such as methyl acetate, ethyl acetate, propyl acetate, methyl formate, ethyl formate, propyl formate, methyl lactate, methyl propionate, ethyl propionate, and propyl propionate. Otherwise, as an organic solvent, the followings can be used: tetrahydropyran, 1,3-dioxane, 1,4-dioxane, N,N-dimethylformamide (DMF), N,N-dimethylacetoamide (DMA), N-methylpyrrolidinone (NMP), N-methyloxazolidinone (NMO), N,N'-dimethylimidazolidinone (DMI), dimethylsulfoxide (DMSO), trimethylphosphate (TMP), nitromethane (NM), nitroethane (NE), sulfolane (SL), methylsulfolane, acetonitrile (AN), glutaronitrile (GLN), adiponitrile (ADN), methoxyacetonitrile (MAN), 3-methoxypropionitrile (MPN), diethyl ether, butylene carbonate, 1,2-dimethoxyethane, 1,3-dioxolan, 4-methyl-1,3-dioxolan, 3-methoxypropylonitrile, N,N-dimethylformamide, N,N-dimethylimidazolidinone, dimethylsulfoxide, trimethyl phosphate, and anisole. Alternatively, an ionic liquid can be used. As the ionic liquid, a conventionally known liquid can be used, which may be selected as required.

Depending on the kind of the electrode combined, a compound obtained by substituting fluorine for at least a part of hydrogen of the solvent (nonaqueous solvent) may be preferable because such a compound may improve the reversibility of the electrode reaction.

An electrolyte layer can be constituted by the electrolytic solution and a polymer compound for retention. The electrolytic solution (nonaqueous electrolytic solution) is retained by the polymer compound for retention, for example. The electrolyte layer in this state is a gel-like electrolyte, providing high ion conductivity (e.g., 1 mS/cm or more at room temperature) and preventing leakage of the nonaqueous electrolytic solution. The electrolyte can be a liquid electrolyte or gel-like electrolyte.

Specific examples of the polymer compound for retention include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVF), polychlorotrifluoroethylene (PCTFE), perfluoroalkoxy fluorine resin (PFA), ethylene tetrafluoride-propylene hexafluoride copolymer (FEP), ethylene-ethylene tetrafluoride copolymer (ETFE), ethylene-chlorotrifluoroethylene copolymer (ECTFE), polyvinyl acetate, polyvinyl alcohol, polymethylmethacrylate, polyacrylic acid, polymethacrylic acid, styrene-butadiene rubber, nitrile-butadiene rubber, polystyrene, polycarbonate, and vinyl chloride. These compounds may be used alone or as a mixture. The polymer compound for retention may be a copolymer. A specific example of the copolymer can be a copolymer of vinylidene fluoride and hexafluoropyrene. Among others, from the standpoint of electrochemical stability, polyvinylidene fluoride is preferable as a single polymer, and a copolymer of vinylidene fluoride and hexafluoropyrene is preferable as a copolymer. As a filler, a compound high in heat resistance, such as $Al_2O_3$, $SiO_2$, $TiO_2$, and BN (boron nitride) may also be included.

As the electrolyte salt, lithium salt, for example, can be used, which may be constituted by one kind or by two or more kinds as a mixture. Examples of the lithium salt may include, but are not limited to, $LiPF_6$, $LiClO_4$, $LiBF_4$, $LiAsF_6$, $LiSbF_6$, $LiTaF_6$, $LiNbF_6$, $LiAlCl_4$, $LiSiF_6$, $LiCF_3SO_3$, $LiN(SO_2CF_3)_2$, $LiN(CnF_{2n+1}SO_2)_2$, $LiC(SO_2CF_3)_3$, $LiB(C_6H_5)_4$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $½Li_2B_{12}F_{12}$, $Li_2SiF_6$, LiCl, LiBr, LiI, difluoro[oxolato-O,O']lithium borate, and lithium bisoxalate borate.

The content of the electrolyte salt is not specifically limited, but is preferably 0.3 mol to 3.0 mol for 1 kg of the solvent from the standpoint of obtaining high ion conductivity. The intrinsic viscosity of the electrolytic solution is not specifically limited, but is preferably 10 mPa/s or less at 25° C. from the standpoint of securing the dissociation property of the electrolyte salt, ion mobility, etc.

Especially, a higher effect can be obtained when the electrolytic solution includes one kind or two or more kinds of sulfonate esters, acid anhydrides, cyclic carboxylate esters, dialkyl sulfoxide, chain dicarbonate esters, aromatic carbonate esters, cyclic carbonate esters, chain monocarbonate esters, chain carboxylate esters, phosphate esters, lithium monofluorophosphate, and lithium difluorophosphate.

In such a nonaqueous secondary battery (specifically, a lithium ion secondary battery), during charging, lithium ions are released from the positive-electrode active material, and occluded in the negative-electrode active material through the electrolytic solution, for example. During discharging, lithium ions are released from the negative-electrode active material, and occluded in the positive-electrode active material through the electrolytic solution, for example.

The positive electrode and the negative electrode may be wound with the separator therebetween a number of times to obtain a spiral or flat electrode structure. Otherwise, the positive electrode and the negative electrode may be stacked with the separator interposed therebetween a number of times to obtain a stacked electrode structure.

Examples of the shape and form of the nonaqueous secondary battery may include a coin type, a button type, a plate type, a square type, a cylinder type, a disk type, and a laminate type (laminate film type). Examples of the exterior body may include a cylindrical battery container (case) having a bottom, a square-type battery container (battery can) having a bottom, and a laminate battery container (exterior member) made by forming a laminate material of aluminum, etc. and a resin film into a predetermined shape.

Examples of the material of the battery container (battery can) may include iron (Fe), nickel (Ni), aluminum (Al), titanium (Ti), alloys of these metals, and stainless steel (SUS). The battery can is preferably plated with nickel, for example, to prevent electrochemical corrosion accompanying charge/discharge of the nonaqueous secondary battery.

The exterior member of the laminate-type (laminate film-type) nonaqueous secondary battery preferably has a multilayer structure of a plastic material layer (fusion layer), a metal layer, and a plastic material layer (surface protection layer), that is, has a form of a laminate film. A laminate film-type nonaqueous secondary battery is made by folding the exterior member so that portions of the fusion layer face each other with a multilayer electrode body interposed therebetween and then fusing the outer edges of the fusion layer portions together, for example. The exterior member may otherwise have two laminate films bonded together with an adhesive, etc. The fusion layer is made of a film of an olefin resin such as polyethylene, polypropylene, denatured polyethylene, denatured polypropylene, and polymers thereof, for example. The metal layer is made of aluminum foil, stainless steel foil, nickel foil, etc., for example. The surface protection layer is made of nylon, polyethylene terephthalate, etc., for example. Among others, the exterior member is preferably an aluminum laminate film of a polyethylene film, aluminum foil, and a nylon film stacked in this order. Note however that the exterior member may be a laminate film having another multilayer structure, a polymer film such as a polypropylene film, or a metal film.

The device (electronic apparatus or electric apparatus) in the present disclosure includes the nonaqueous secondary battery of the present disclosure described above.

The device in the present disclosure including the nonaqueous secondary battery (specifically, the lithium ion secondary battery) of the present disclosure can be used as a driving power supply or an auxiliary power supply for a laptop personal computer, a battery pack used for a personal computer, etc. as a removable power supply, various displays, a personal digital assistant (PDA), a mobile phone, a smartphone, a main phone and its cordless handset, a video camera and a camcorder, a digital still camera, electronic paper such as an electronic book and an electronic newspaper, an electronic dictionary, a music player, a portable music player, a radio set, a portable radio set, a headphone, a headphone stereo, a game machine, a navigation system, a memory card, a cardiac pacemaker, a hearing aid, an electric tool, an electric shaver, a refrigerator, an air conditioner, a TV receiver, a stereo, a water heater, a microwave oven, a dish washer, a washing machine, a dryer, lighting equipment including a room light, various types of electrical apparatus (including portable electronic apparatus), a toy, medical equipment, a robot, a load conditioner, a traffic light, a railroad vehicle, a golf cart, an electric cart, and an electric car (including a hybrid car), for example. Also, the device in the present disclosure can be mounted in a power supply, etc. for power storage for buildings including a home or power generation facilities, or can be used for supplying electric power to them. In an electric car, a converter that converts electric power to driving force by supplying electric power is generally a motor. As a controller (control unit) that performs information processing related to vehicle control, included is a controller that performs secondary battery remaining amount indication based on information related to the remaining amount of the secondary battery. The secondary battery can also be used in an electric storage device in a so-called smart grid. Such an electric storage device can, not only supply electric power, but also store electric power by receiving electric power from another power source. As another power source, thermal power generation, nuclear power generation, hydro power generation, solar cells, wind power generation, geothermal power generation, and fuel cells (including biofuel cells), for example, can be used.

The nonaqueous secondary battery of the present disclosure including the preferred forms and configurations described above can be applied to a nonaqueous secondary battery in a battery pack having the nonaqueous secondary battery, a control means (control unit) that performs controls related to the nonaqueous secondary battery, and an exterior package including the nonaqueous secondary battery. In such a battery pack, the control means controls charge/discharge, over discharge, or overcharge related to the nonaqueous secondary battery.

The nonaqueous secondary battery of the present disclosure including the preferred forms and configurations described above can be applied to a nonaqueous secondary battery in an electronic apparatus that receives electric power from the nonaqueous secondary battery.

The nonaqueous secondary battery of the present disclosure including the preferred forms and configurations described above can be applied to a nonaqueous secondary battery in an electrically-driven vehicle having a converter that converts electric power received from the nonaqueous secondary battery to driving force of the vehicle and a controller (control unit) that performs information processing related to vehicle control based on information related to the nonaqueous secondary battery. In this electrically-driven vehicle, the converter typically drives a motor with electric power received from the nonaqueous secondary battery to generate driving force. Regenerative energy can also be used to drive the motor. The controller (control unit) performs information processing related to vehicle control based on the battery remaining amount of the nonaqueous secondary battery, for example. Examples of the electrically-driven vehicle include a so-called hybrid car in addition to an electric car, an electric motorcycle, an electric bicycle, and a railroad vehicle.

The nonaqueous secondary battery of the present disclosure including the preferred forms and configurations described above can be applied to a nonaqueous secondary battery in an electric power system configured to receive electric power from the nonaqueous secondary battery and/or supply electric power from an electric power source to the nonaqueous secondary battery. This electric power system can be any kind of electric power system as far as it uses electric power, and includes a mere electric power device. Examples of such an electric power system include a smart grid, a home energy management system (HEMS), and a vehicle, and can store electric power.

The nonaqueous secondary battery of the present disclosure including the preferred forms and configurations described above can be applied to a nonaqueous secondary battery in a power supply for power storage that has the nonaqueous secondary battery and is configured to allow connection of an electronic apparatus to which electric power is supplied. This power supply for power storage can be basically used for any electric power system and electric power device. For example, it can be used for a smart grid.

As the device, a capacitor, a sensor, a magnesium ion filter, etc. can also be listed. The capacitor includes a positive electrode, a negative electrode, and a separator interposed between the positive electrode and the negative electrode and impregnated with an electrolytic solution.

Example 1 relates to the negative-electrode active material and the method of manufacturing the same of the present disclosure, and the nonaqueous secondary battery of the present disclosure.

As shown in FIG. 1 that is a conceptual view showing a cross section, a negative-electrode active material 10 of Example 1 is constituted by a particle containing a core 11 and a coat layer 14 coating at least a part of the surface of the core 11. The core 11 is made of a nickel silicide-based material 12 and a silicon oxide-based material 13, and the coat layer 14 is made of a nickel silicate-based material. From SEM observation, it was found that the particle had no uniform shape (had various shapes such as an elliptic shape and a rhombic shape in addition to a spherical shape). The diameter $d_{50}$ of the negative-electrode active material particle as assumed to be a complete sphere was $5 \times 10^{-6}$ m.

The nonaqueous secondary battery of Example 1 includes a negative electrode having a negative-electrode active material, and the negative-electrode active material is the negative-electrode active material of Example 1.

The first nickel silicide-based material 12 constituting the core 11 includes $Ni_XSi$ (where $0<X\leq2$), the silicon oxide-based material 13 constituting the core 11 is made of $Ni_YSiO_Z$ (where $0<Y<1$ and $0<Z<3$), and the second nickel silicate-based material constituting the coat layer 14 includes $Ni_USiO_V$ (where $1\leq U\leq2$ and $3\leq V\leq4$).

Specifically, the nickel silicide-based material 12 constituting the core 11 is made of nickel silicide, $Ni_XSi$ (where $X=0.5$ to 1, for example), the silicon oxide-based material 13 constituting the core 11 is made of $Ni_YSiO_Z$ (where $Y=1$ and $Z=3$, for example), and the nickel silicate-based material constituting the coat layer 14 is made of $NiSiO_3$ (i.e., $U=1$ and $V=3$). Otherwise, the nickel silicate-based material constituting the coat layer 14 is made of $Ni_2SiO_4$ (i.e., $U=2$ and $V=4$). Note that in the negative-electrode active material 10, the value of X in $Ni_XSi$ may vary, the values of Y and Z in $Ni_YSiO_Z$ may vary, and the values of U and V in $Ni_USiO_V$ may vary. In the silicon oxide-based material 13 constituting the core 11, $Y=0$ may stand locally. Also, $X=0.01$ may stand in some cases, $Y=0.01$ may stand in some cases, and $Z=0.01$ may stand in some cases.

As shown in FIG. 1, in the negative-electrode active material 10 of Example 1, the core 11 has a sea-island structure, where the nickel silicide-based material 12 corresponds to the island and the silicon oxide-based material 13 corresponds to the sea. While the nickel silicide-based material 12 corresponding to the island is shown as having a spherical shape, it has not a uniform shape actually and may have various shapes such as an elliptic shape and a rhombic shape, in addition to the spherical shape. The coat layer 14 coats an entire surface of the core 11. The negative-electrode active material of Example 1 is a negative-electrode active material for a nonaqueous secondary battery, specifically, a negative-electrode active material constituting a negative electrode of a nonaqueous secondary battery such as a lithium-ion secondary battery.

Further, in the negative-electrode active material of Example 1, the nickel silicide-based material 12 takes up 10 parts by mass to 90 parts by mass, specifically 50 parts by mass, with respect to 100 parts by mass of the core 11. The core 11 takes up 50 parts by mass to 99.9 parts by mass, specifically 95 parts by mass, for example, with respect to 100 parts by mass of the negative-electrode active material.

The silicon oxide-based material 13 constituting the core 11 has non-crystallinity (is in an amorphous state) or low crystallinity. The nickel silicide-based material 12 constituting the core 11 has crystallinity. The nickel silicate-based material constituting the coat layer 14 has non-crystallinity (is in an amorphous state) or low crystallinity.

The electric resistivity of the nickel silicide-based material 12 constituting the core 11 is as low as $1 \times 10^{-5}$ Ω·cm to $5 \times 10^{-5}$ Ω·cm. Note that the electric resistivity of crystalline silicon is about $1 \times 10^3$ Ω·cm.

The method of manufacturing a negative-electrode active material of Example 1 will be described hereinafter. In this method of Example 1, a solution containing nickel and silicon oxide particles are mixed, and the mixture is dried and then heat-treated in a reduction atmosphere. The solution containing nickel includes nickel acetate salt. The heat-treatment is performed at 600° C. to 1000° C. for one hour or longer, and the reduction atmosphere is an inactive gas atmosphere containing hydrogen gas.

Specifically, first, nickel acetate salt was dissolved in ethylene glycol and mixed with amorphous $SiO_x$ nanoparticles to form slurry. Thereafter, the slurry put in a beaker or a petri dish was dried for 60 minutes on a hot plate heated to 200° C. The atmosphere in this process is normal air environment. In this way, $SiO_x$ nanoparticles coated with an organic nickel derivative could be obtained. After drying, the nanoparticles were ground in a mortar, and the ground one was subjected to heat-treatment (reduction treatment) at 1000° C. for five hours in an argon/hydrogen mixed gas (hydrogen gas: 4% by volume) in a quartz tubular furnace, to perform dismutation treatment. By this, nickel was reduced to the metal state, diffusing into the inside of the $SiO_x$ nanoparticles. That is, diffusion of nickel and doping by heat-treatment (reduction treatment) is achieved. In this way, the negative-electrode active material of Example 1 was obtained.

Nickel (Ni) is known to be able to diffuse in a silicon oxide-based material (see P S Lee, et al., Microelectronic Engineering 51-52, 583-594 (2000), for example). It is therefore expected to improve the conductivity of silicon nanodomains in the silicon oxide-based material. Also, the coating of the surfaces of the $SiO_x$ nanoparticles with the organic nickel derivative makes it possible to coat the entire surfaces, compared to a milling method, and is a process that facilitates silicification reaction, and reduction to metal nickel, of organic nickel or nickel oxide, and diffusion of nickel. By this, the structure shown in FIG. 1 can be easily obtained.

Figure 3:
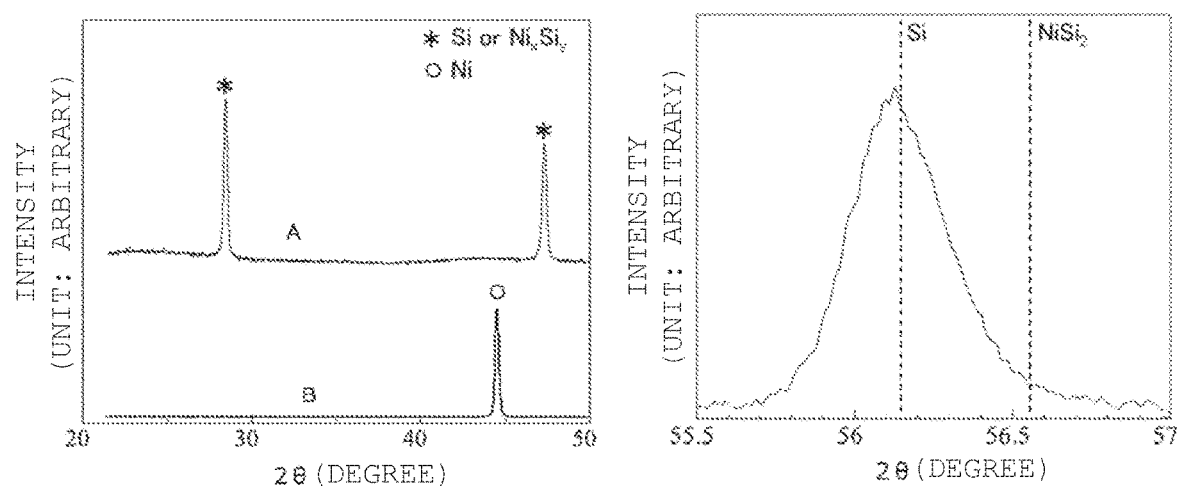
FIG. 3 shows charts illustrating XRD patterns of the negative-electrode active material according to an embodiment of the present technology.

FIG. 3 shows XRD patterns of the negative-electrode active material of Example 1. While a peak of metal nickel appeared intensively for 400° C. reduction treatment (see "B" in FIG. 3), the peak of metal nickel disappeared and sharp peaks of crystalline silicon appeared for 1000° C. reduction treatment (see "A" in FIG. 3). As a result of analysis of detailed pattern (see the right-side chart in FIG. 3) in silicon (311) region, it is found that silicon is the main phase, having a shoulder on the wide-angle side. Since silicon and $Ni_xSi$ are in the relation forming a solid solution, it was determined to be lattice contraction due to substitution of a minute amount of nickel for silicon, not generation of $NiSi_2$ phase.

Figure 4:
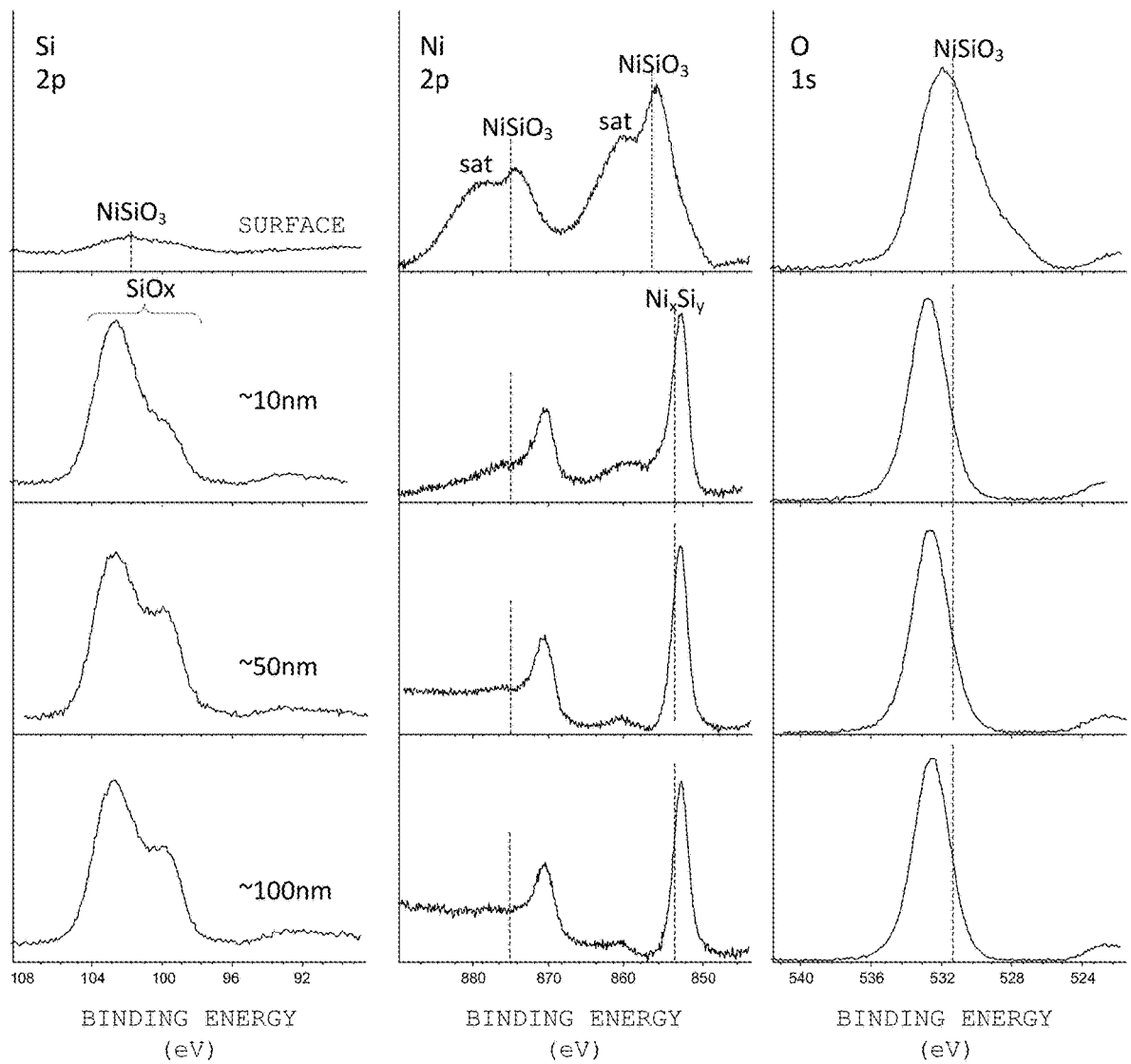
FIG. 4 shows charts illustrating XPS spectrum analysis results with the depth of the negative-electrode active material as the basis according to an embodiment of the present technology.

The charts in FIG. 4 show XPS spectrum analysis results with respect to the depth of the negative-electrode active material of Example 1. The XPS spectra on the top row in FIG. 4 show the results of analysis of the surface of the negative-electrode active material of Example 1, the XPS spectra on the second top row in FIG. 4 show the results of analysis of a region about 10 nm deep from the surface of the negative-electrode active material of Example 1, the XPS spectra on the third top row in FIG. 4 show the results of analysis of a region about 50 nm deep from the surface of the negative-electrode active material of Example 1, and the XPS spectra on the bottom row in FIG. 4 show the results of analysis of a region about 100 nm deep from the surface of the negative-electrode active material of Example 1.

A nickel silicate-based material (specifically, nickel silicate, $NiSiO_3$) is formed on the uppermost surface of the negative-electrode active material of Example 1. As a result of Ar-ion etching of the negative-electrode active material of Example 1 by about 10 nm from the surface, the nickel silicate-based material was removed, and information of $SiO_x$ was obtained. The $SiO_x$ had more or less undergone dismutation (generation of Si domains), but had not largely changed from $SiO_x$ subjected to no heat-treatment. However, the added nickel had changed to a peak indicating nickel silicide ($Ni_xSi$). Further, as a result of Ar-ion etching of the negative-electrode active material of Example 1 by about 100 nm from the surface, the value of the peak of nickel was constant. From this, it was confirmed that not only the core was coated with the nickel silicate-based material, but also nickel had diffused into the inside of $SiO_x$.

Figure 2:
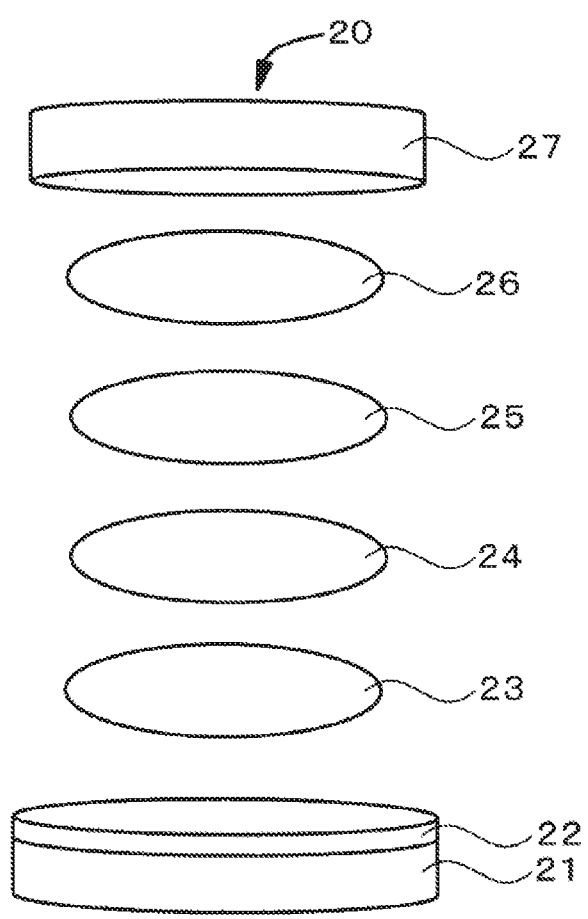
FIG. 2 is a diagrammatic exploded view of a lithium ion secondary battery according to an embodiment of the present technology.

Using the thus-obtained negative-electrode active material of Example 1, the nonaqueous secondary battery of Example 1, specifically, the lithium ion secondary battery was manufactured. FIG. 2 shows a diagrammatic exploded view of the lithium ion secondary battery (coin battery) of Example 1. Specifically, a coin battery 20 is formed as follows: a gasket 22 is placed on a coin battery can 21, a positive electrode 23, a separator 24, a negative electrode 25 having a diameter of 1.5 mm, a spacer 26 made of a stainless steel plate having a thickness of 0.5 mm, and a coin battery lid 27 are stacked in this order, and the coin battery can 21 is crimped for sealing. The spacer 26 is previously spot-welded to the coin battery lid 27. An electrolytic solution is included in the separator 24. The negative electrode 25 can be obtained by mixing the negative-electrode active material of Example 1 with a kind of varnish made of a polyimide resin at a mass ratio of 7:2, firing the mixture in a firing furnace at 700° C., and then shaping the fired one.

Using the thus-obtained negative-electrode active material of Example 1, the nonaqueous secondary battery of Example 1 for testing/evaluation, specifically, the lithium ion secondary battery was manufactured on a trial basis. The specifications of the lithium ion secondary battery of Example 1 for testing/evaluation (hereinafter referred to as the "secondary battery for testing/evaluation") are shown in Table 1 below.

TABLE 1

| | |
|---|---|
| Counter electrode | Li plate (diameter: 15 mm) |
| Negative-electrode active material | Negative-electrode active material of Example 1 |
| Negative-electrode binder | Polyimide resin (Negative-electrode active material: negative-electrode binder = 7:2 (mass ratio)) (Mixture of negative-electrode active material/negative-electrode binder is fired at 700° C.) |
| Separator | Porous film made of polyethylene resin |
| Electrolyte layer | |
| Solvent | EC/FEC/DMC = 40/10/50 mass % |
| Electrolyte salt | $LiPF_6$ (1 mole/1 kg of solvent) |

The secondary battery for testing/evaluation was subjected to a cycle test and charge/discharge tests under the following conditions. Note that, as Comparative Example 1, used was a negative-electrode active material obtained by heat-treating amorphous $SiO_x$ nanoparticles in argon/hydrogen mixed gas (hydrogen gas: 4 mass %) in a quartz tubular furnace at 1000° C. for five hours. The particulate negative-electrode active material of Comparative Example 1 has the sea-island structure, where silicon corresponds to the island and $SiO_x$ corresponds to the sea.

Figure 5A:
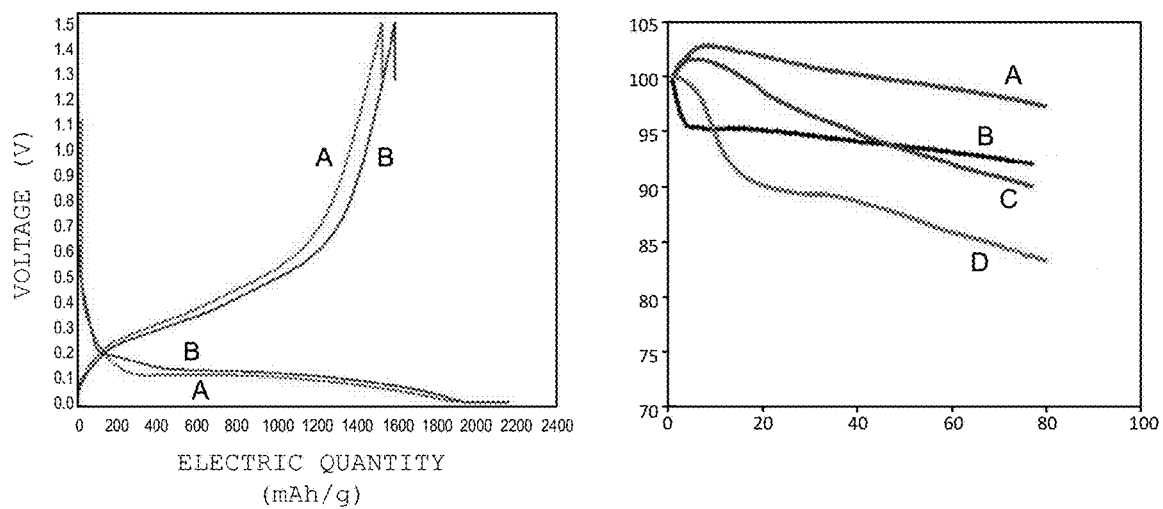
FIG. 5A shows graphs illustrating first charge/discharge curves in lithium ion secondary batteries of Example 1 and Comparative Example 1 according to an embodiment of the present technology.

Cycle Test
First Cycle
  CC charge until 0 volt, thereafter CV charge (cutoff at 0.04 mA)
    Charge condition: 0.2 milliampere/cm$^2$
  Discharge until 1.5 volts
    Discharge condition: 0.2 milliampere/cm$^2$
Second and Subsequent Cycles
  CC charge until 0 volt, thereafter CV charge (cutoff at 0.04 mA)
    Charge condition: 1.0 milliampere/cm$^2$
  Discharge until 1.5 volts
    Discharge condition: 1.0 milliampere/cm$^2$
First to Second Charge/Discharge Tests
  CC charge at 0.2 C until 0 volt, thereafter CV charge (cutoff at 0.04 mA)
  CC discharge at 0.2 C until 1.5 volts
Third to Fourth Charge/Discharge Tests
  CC charge at 0.2 C until 0 volt, thereafter CV charge (cutoff at 0.04 mA)
  CC discharge at 0.5 C until 1.5 volts
Fifth to Sixth Charge/Discharge Tests
  CC charge at 0.2 C until 0 volt, thereafter CV charge (cutoff at 0.04 mA)
  CC discharge at 1 C until 1.5 volts
Seventh to Eighth Charge/Discharge Tests
  CC charge at 0.2 C until 0 volt, thereafter CV charge (cutoff at 0.04 mA)
  CC discharge at 2 C until 1.5 volts
Ninth to Tenth Charge/Discharge Tests
  CC charge at 0.2 C until 0 volt, thereafter CV charge (cutoff at 0.04 mA)
  CC discharge at 0.2 C until 1.5 volts As shown in the left-side graph in FIG. 5A, the charge/discharge curves had roughly the same shapes for both the secondary batteries for testing/evaluation of Example 1 (see "A" in the left-side graph in FIG. 5A) and Comparative Example 1 (see "B" in the left-side graph in FIG. 5A). The initial charge capacity was 2140 mAh/gram, and the initial efficiency was 71% in 1.5 Volt discharge. In the left-side graph in FIG. 5A, the x-axis represents the capacity (unit: mAh/gram) and the y-axis represents the voltage (unit: volt). As shown in the right-side graph in FIG. 5A, in the cycle characteristics, the secondary battery for testing/evaluation of Example 1 (see "A" in the right-side graph in FIG. 5A) is found to be superior to the secondary battery for testing/evaluation of Comparative Example 1 (see "B" in the right-side graph in FIG. 5A). In particular, degradation in initial cycles has been suppressed, and no largely falling degradation progress, like that observed in the secondary battery for testing/evaluation of Comparative Example 1, is observed. In the right-side graph in FIG. 5A, the x-axis represents the cycle (unit: number of times) and the y-axis represents the retention (unit: %). Also in the right-side graph in FIG. 5A, "C" is data of a battery in which the surface of the negative-electrode active material in Comparative Example 1 is coated with a carbon film, and "D" is data of a battery in which the surface of a negative-electrode active material made of amorphous $SiO_x$ is coated with a carbon film.

Figure 5B:
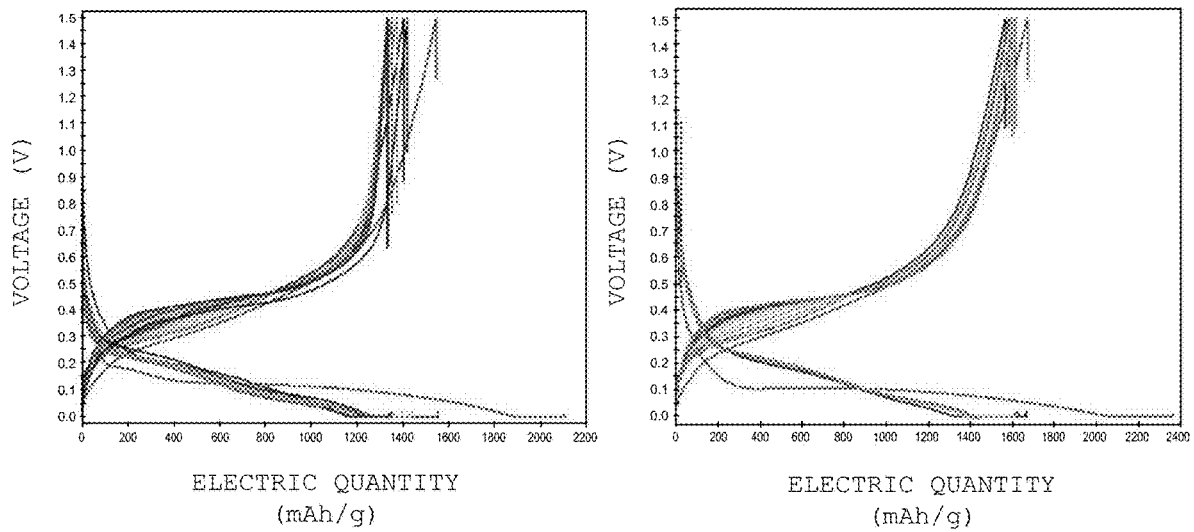
FIG. 5B shows graphs illustrating superimposition of charge/discharge curves in the first to twentieth charge/discharge cycles in the lithium ion secondary batteries of Example 1 and Comparative Example 1 according to an embodiment of the present technology.

FIG. 5B shows illustrations of superimposition of charge/discharge curves of the secondary batteries for testing/evaluation of Example 1 and Comparative Example 1 in the first to twentieth circles. In the secondary battery for testing/evaluation of Comparative Example 1 (see the left-side graph in FIG. 5B), a discharge end-stage degradation phenomenon (phenomenon where the discharge curve becomes close to vertical) is recognized in initial cycles. This is a phenomenon characteristic to $SiO_x$, i.e., an initial-cycle degradation mode of $SiO_x$. On the other hand, such a change is not observed in the secondary battery for testing/evaluation of Example 1 (see the right-side graph in FIG. 5B) with a discharge rest voltage (open-circuit voltage after discharge, OCV) being retained high. This can be explained by a Ni adding effect (good Li drawability), considered to be an effect of the coat layer containing nickel silicate ($NiSiO_3$). Note that, as the Li amount remaining in the negative-electrode active material is greater, the discharge rest voltage largely decreases. In FIG. 5B, the x-axis represents the electric quantity (unit: mAh/gram) and the y-axis represents the voltage (unit: volt).

Figure 6:
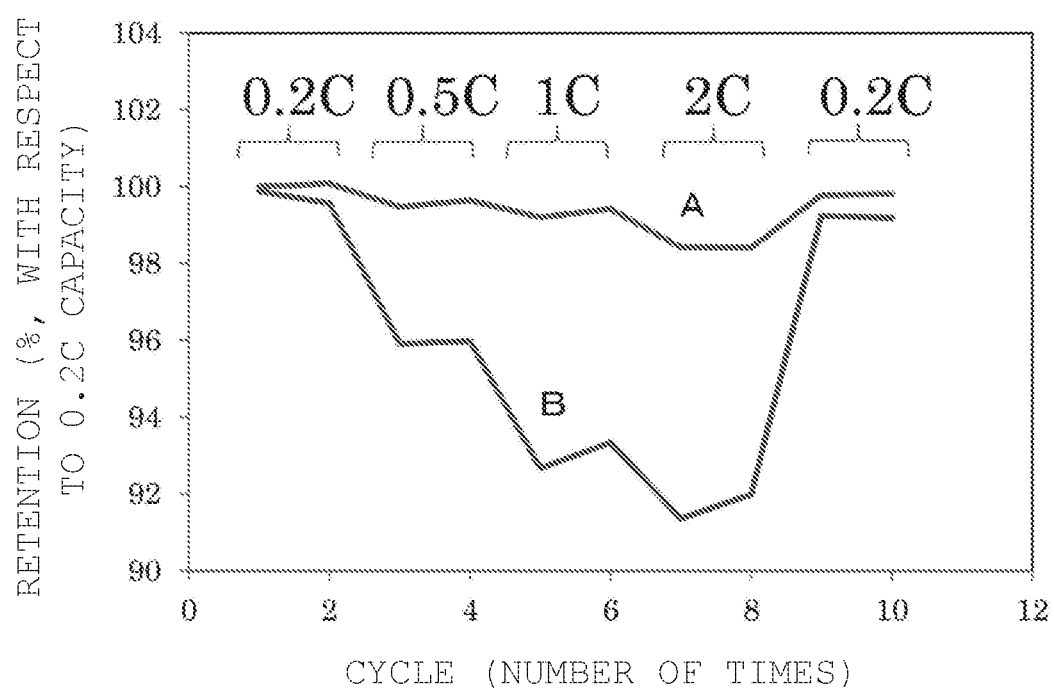
FIG. 6 is a graph showing discharge rate dependence of the lithium ion secondary batteries of Example 1 and Comparative Example 1 according to an embodiment of the present technology.

FIG. 6 shows the discharge rate dependence of the secondary batteries for testing/evaluation of Example 1 ("A" in FIG. 6) and Comparative Example 1 ("B" in FIG. 6) obtained by performing the first to tenth charge/discharge tests. The first to tenth charge/discharge tests were performed as described above. In FIG. 6, the x-axis represents the number of charge/discharge cycles (unit: number of times), and the y-axis represents the retention value (unit: %, standardized with reference to the results at 0.2 C discharge in the first cycle). The discharge results at 2 C were 98.4% for the secondary battery for testing/evaluation of Example 1 and 91.7% for the secondary battery for testing/evaluation of Comparative Example 1, indicating a significant improvement in Example 1. That is, Example 1 has high applicability to rapid charge and high-output applications.

While the lithium ion secondary battery constituted by the negative-electrode active material made of an $SiO_x$-based active material has a charge capacity density as high as 2500 mAh/gram, it has a very low initial efficiency of the order of 70%. Therefore, the merit of capacity increase as the battery cell is small: presently, $SiO_x$ is only added to graphite by a minute amount (e.g., 1 mass % to 6 mass %). Although expectations on the $SiO_x$ material are great as a foothold for future introduction of the Si-based negative-electrode active material, this low initial efficiency forms a bottleneck in large-scale introduction. Further, in the cycle characteristics and the high-output, rapid charge properties, also, it is expected that higher-level specifications will be required in the future. It is therefore strongly desired to produce a negative-electrode active material surpassing the present $SiO_x$-based active material.

As described above, in the negative-electrode active material of Example 1, the coat layer is made of a nickel silicate-based material. Therefore, metal ions (e.g., lithium ions) easily enter and leave the inside the negative-electrode active material, and also can protect the core reliably. Also, the core is constituted by a nickel silicide-based material, which has high electric conductivity. From the above results, the nonaqueous secondary battery having such a negative-electrode active material has high load characteristics, excellent discharge rate characteristics and cycle characteristics, and permits high-speed charge/discharge. Moreover, since the coat layer made of a nickel silicate-based material is formed by chemical reaction between nickel and a silicon oxide-based material on the surface of the silicon oxide-based material, not formed physically, high adhesion can be secured between the surface of the core and the coat layer. That is, unlike the case of coating the surface of the negative-electrode active material with a carbon film, the coat layer is resistant to peeling off from the core. The secondary battery having such a negative-electrode active material has high long-term reliability.

In Example 2, the nonaqueous secondary battery (specifically, the lithium ion secondary battery) of the present disclosure and applications thereof will be described.

The nonaqueous secondary battery (specifically, the lithium ion secondary battery) of the present disclosure described in Example 1 can be applied to machines, apparatuses, instruments, devices, and systems (groups of a plurality of apparatuses, etc.) that can use a secondary battery as a power supply for driving/actuating or a power storage source for power storage without any special limitations. The nonaqueous secondary battery used as a power supply may be a main power supply (preferentially used power supply) or an auxiliary power supply (power supply used in place of a main power supply or by being switched from a main power supply). When the nonaqueous secondary battery of the present disclosure is used as an auxiliary power supply, the main power supply is not necessarily the nonaqueous secondary battery of the present disclosure.

Specific examples of the use of the nonaqueous secondary battery (specifically, the lithium ion secondary battery) of the present disclosure include, but are not limited to, driving of: various electronic apparatuses and electric apparatuses (including portable electronic apparatuses) such as a video camera and a camcorder, a digital still camera, a mobile phone, a personal computer, a TV receiver, various displays, a cordless phone, a headphone stereo, a music player, a portable radio set, electronic paper such as an electronic book and an electronic newspaper, and a portable information terminal including a PDA; a toy; portable daily appliances such as an electric shaver; lighting equipment such as a room light; medical electronic apparatus such as a pacemaker and a hearing aid; memory devices such a memory card; battery packs used for a personal computer, etc. as a removable power supply; electric tools such as an electric drill and an electric saw; power storage systems and home energy servers (home electric storage devices) such as a home battery system for storing electric power in preparation for emergency, etc., as well as power supply systems; an electric storage unit and a backup power supply; electrically-driven vehicles such as an electric car, an electric motorcycle, an electric bicycle, and a Segway (registered trademark); and electric power-driving force converters for airplanes and marine vessels (specifically, a motor).

Among others, the nonaqueous secondary battery of the present disclosure is effective when being applied to a battery pack, an electrically-driven vehicle, a power storage system, a power supply system, an electric appliance, an electronic apparatus, an electric apparatus, etc. The battery pack is a power supply using the nonaqueous secondary battery of the present disclosure, and a so-called assembled battery. The electrically-driven vehicle is a vehicle actuated (running) using the nonaqueous secondary battery of the present disclosure as a power supply for driving, which may include a car also including a driving source other than the secondary battery (a hybrid car, etc.). The power storage system and the power supply system are systems using the nonaqueous secondary battery of the present disclosure as a power storage source. For example, a home power storage system (power supply system) stores electric power in the nonaqueous secondary battery of the present disclosure as a power storage source, whereby home electric products, etc. can be used using the electric power. The electric tools are tools of which a movable part (e.g., a drill) moves with the nonaqueous secondary battery of the present disclosure used as a power supply for driving. The electronic apparatus and the electric apparatus are apparatuses that exert various functions with the nonaqueous secondary battery of the present disclosure used as a power supply (power supply source) for actuation.

A cylinder-type lithium ion secondary battery and a plate laminate film-type lithium ion secondary battery will be described hereinafter.

Figure 7:
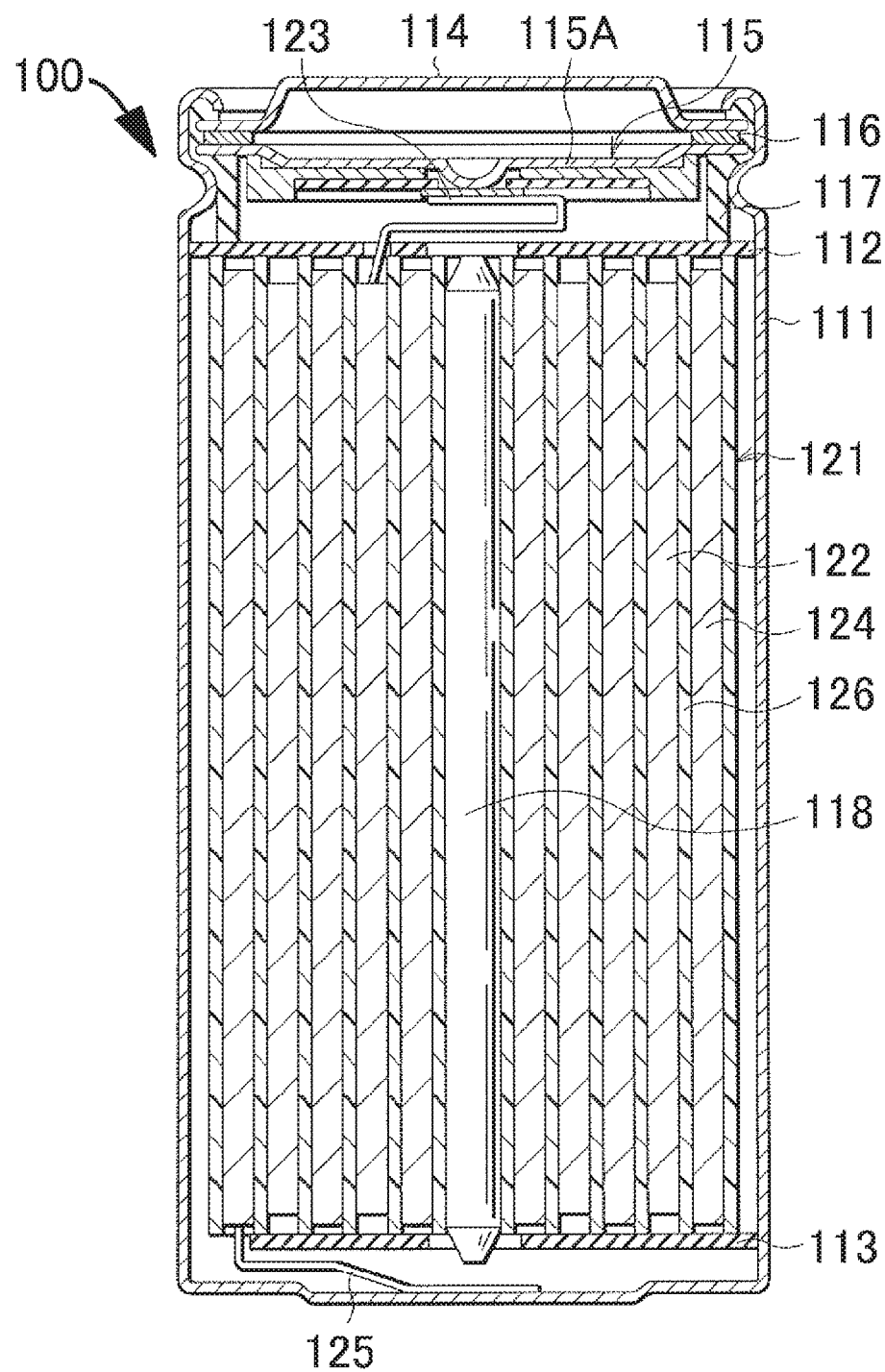
FIG. 7 is a diagrammatic cross-sectional view of a nonaqueous secondary battery (cylinder-type nonaqueous secondary battery) according to an embodiment of the present technology.

FIG. 7 shows a diagrammatic cross-sectional view of a cylinder-type lithium ion secondary battery 100. The lithium ion secondary battery 100 includes an electrode structure 121 and a pair of insulating plates 112 and 113 housed in a roughly hollow cylindrical electrode structure housing 111. The electrode structure 121 can be produced by stacking a positive electrode 122 and a negative electrode 124 with a separator 126 interposed therebetween to obtain an electrode structure and then winding the electrode structure. The electrode structure housing (battery can) 111 has a hollow structure with one end closed and the other end open, made of iron (Fe), aluminum (Al), etc. The surface of the electrode structure housing 111 may be plated with nickel (Ni), etc. The pair of insulating plates 112 and 113 is placed to sandwich the electrode structure 121 and extend vertically to the circumference of the wound electrode structure 121. At the open end of the electrode structure housing 111, a battery lid 114, a safety valve mechanism 115, and a thermosensitive resistance element (positive temperature coefficient (PTC) element) 116 are crimped via a gasket 117, whereby the electrode structure housing 111 is sealed. The battery lid 114 is made of a material similar to the electrode structure housing 111. The safety valve mechanism 115 and the thermosensitive resistance element 116 are placed on the inner side of the battery lid 114, where the safety valve mechanism 115 is electrically connected to the battery lid 114 via the thermosensitive resistance element 116. A disk plate 115A of the safety valve mechanism 115 reverses the polarity when the inner pressure becomes or exceeds a fixed value due to an internal short-circuit, heating from outside, etc. By this, the electrical connection between the battery lid 114 and the electrode structure 121 is cut off. In order to prevent abnormal heating caused by high current, the resistance of the thermosensitive resistance element 116 increases with rise in temperature. The gasket 117 is made of an insulating material, for example. Asphalt, etc. may be applied to the surface of the gasket 117.

A center pin 118 is inserted in the center of the winding of the electrode structure 121. Note however that the center pin 118 may not be inserted. A positive-electrode lead 123 made of a conductive material such as aluminum is connected to the positive electrode 122. Specifically, the positive-electrode lead 123 is attached to a positive-electrode power collector. A negative-electrode lead 125 made of a conductive material such as copper is connected to the negative electrode 124. Specifically, the negative-electrode lead 125 is attached to a negative-electrode power collector. The negative-electrode lead 125 is welded to the electrode structure housing 111 and electrically connected to the electrode structure housing 111. The positive-electrode lead 123 is welded to the safety valve mechanism 115 and electrically connected to the battery lid 114. Note that, although the negative-electrode lead 125 is provided at one position (at the outermost circumference of the wound electrode structure) in the example illustrated in FIG. 7, it is in some cases provided at two positions (at the outermost and innermost circumferences of the wound electrode structure).

The electrode structure 121 includes the positive electrode 122 including a positive-electrode active material layer formed on the positive-electrode power collector (specifically, on both sides of the positive-electrode power collector) and the negative electrode 124 including a negative-electrode active material layer (made of the negative-electrode active material of Example 1) formed on a negative-electrode power collector (specifically, on both sides of the negative-electrode power collector), stacked with the separator 126 interposed therebetween. The positive-electrode active material layer is not formed in the region of the positive-electrode power collector where the positive-electrode lead 123 is attached, and the negative-electrode active material layer is not formed in the region of the negative-electrode power collector where the negative-electrode lead 125 is attached.

The specifications of the lithium ion secondary battery 100 are shown in Table 2 below although they are not limited to these.

TABLE 2

| | |
|---|---|
| Positive-electrode power collector | 20 µm-thick aluminum foil |
| Positive-electrode active material layer | Thickness: 50 µm per side |
| Positive-electrode lead | 100 µm-thick aluminum (Al) foil |
| Negative-electrode power collector | 20 µm-thick copper foil |
| Negative-electrode active material layer | Thickness: 50 µm per side |
| Negative-electrode lead | 100 µm-thick nickel (Ni) foil |

The lithium ion secondary battery 100 can be manufactured according to the following procedure, for example.

First, the positive-electrode active material layer is formed on both sides of the positive-electrode power collector, and the negative-electrode active material layer is formed on both sides of the negative-electrode power collector.

Thereafter, the positive-electrode lead 123 is attached to the positive-electrode power collector by a welding method, etc. Also, the negative-electrode lead 125 is attached to the negative-electrode power collector by a welding method, etc. The positive electrode 122 and the negative electrode 124 are then stacked with the separator 126 made of a 20 μm-thick microporous polyethylene film interposed therebetween, and the resultant structure (more specifically, the electrode structure (layered structure) of positive electrode 122/separator 126/negative electrode 124/separator 126) is wound to produce the electrode structure 121. A protection tape (not shown) is then pasted on the outermost circumference of the electrode structure 121. Thereafter, the center pin 118 is inserted into the center of the electrode structure 121. While being sandwiched by the pair of insulating plates 112 and 113, the electrode structure 121 is housed inside the electrode structure housing (battery can) 111. At this time, the tip of the positive-electrode lead 123 is attached to the safety valve mechanism 115 by a welding method, and the tip of the negative-electrode lead 125 is attached to the electrode structure housing 111. Thereafter, the electrolytic solution in Example 1 is injected based on a decompression method, to impregnate the separator 126 with the electrolytic solution. The battery lid 114, the safety valve mechanism 115, and the thermosensitive resistance element 116 are then crimped onto the open end of the electrode structure housing 111 via the gasket 117.

Figure 8:
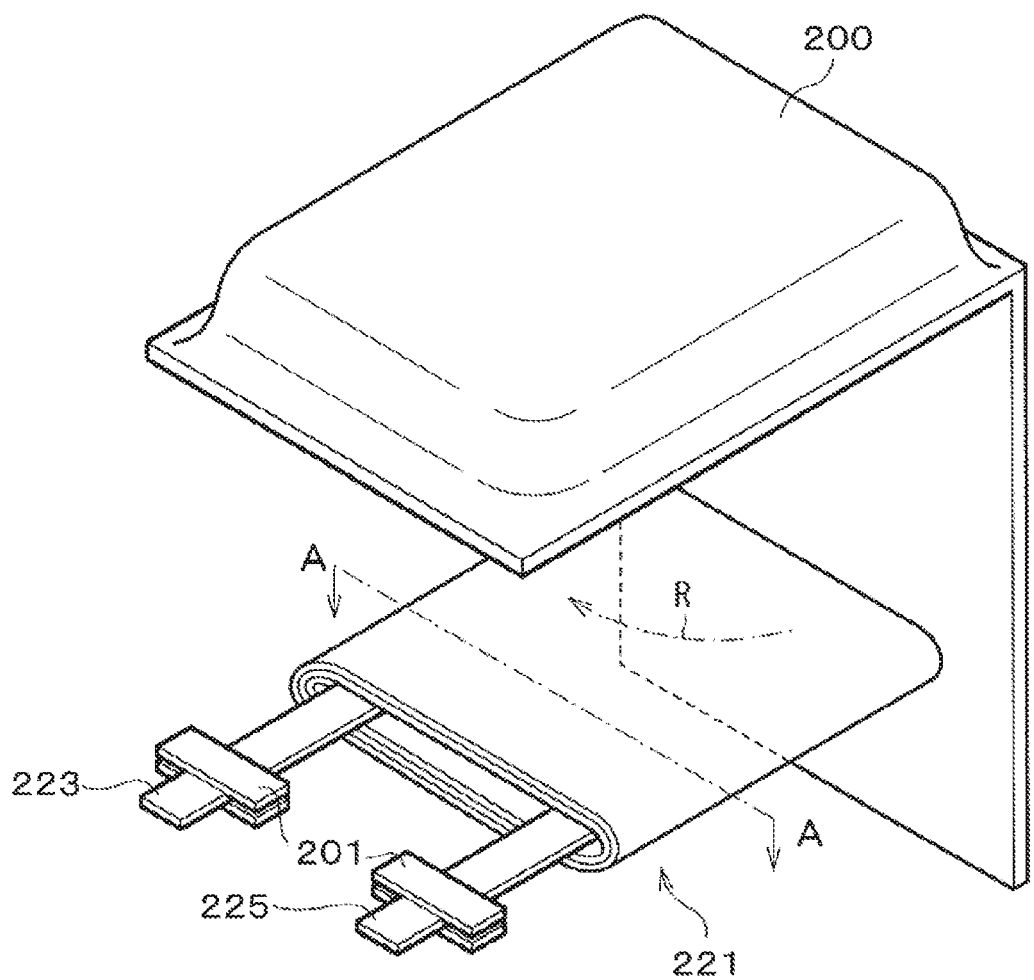
FIG. 8 is a diagrammatic cross-sectional view of a nonaqueous secondary battery (plane laminate-film type nonaqueous secondary battery) according to an embodiment of the present technology.

Next, the plate laminate film-type secondary battery will be described. FIG. 8 shows a diagrammatic exploded perspective view of the secondary battery. In this secondary battery, an electrode structure 221 basically similar to that described above is housed inside an exterior member 200 made of a laminate film. The electrode structure 221 can be produced by stacking a positive electrode and a negative electrode with a separator and an electrolyte layer interposed therebetween and then winding the layered structure. A positive-electrode lead 223 is attached to the positive electrode, and a negative-electrode lead 225 is attached to the negative electrode. The outermost circumference of the electrode structure 221 is protected with a protection tape. The positive-electrode lead 223 and the negative-electrode lead 225 protrude outward from the inside of the exterior member 200 in the same direction. The positive-electrode lead 223 is formed of a conductive material such as aluminum. The negative-electrode lead 225 is formed of a conductive material such as copper, nickel, and stainless steel.

The exterior member 200 is a single film foldable in the direction R shown in FIG. 8, and has a recess (embossment) for housing the electrode structure 221. The exterior member 200 is a laminate film of a fusion layer, a metal layer, and a surface protection layer stacked in this order, for example. In the manufacturing process of the secondary battery, the exterior member 200 is folded so that portions of the fusion layer face each other with the electrode structure 221 interposed therebetween and then fusing the outer edges of the fusion layer portions together. The exterior member 200 may otherwise have two laminate films bonded together with an adhesive, etc. The fusion layer is made of a film of polyethylene, polypropylene, etc., for example. The metal layer is made of aluminum foil, etc., for example. The surface protection payer is made of nylon, polyethylene terephthalate, etc., for example. Among others, the exterior member 200 is preferably an aluminum laminate film of a polyethylene film, aluminum foil, and a nylon film stacked in this order. Note however that the exterior member 200 may be a laminate film having another multilayer structure, a polymer film such as polypropylene, or a metal film. Specifically, the exterior member 200 is made of a moisture-resistant aluminum laminate film (total thickness: 100 μm) of a nylon film (thickness: 30 μm), aluminum foil (thickness: 40 μm), and a non-drawn polypropylene film (thickness: 30 μm) stacked in this order from the outside.

In order to prevent air intrusion, contact films 201 are inserted between the exterior member 200 and the positive-electrode lead 223 and between the exterior member 200 and the negative-electrode lead 225. The contact films 201 are made of a material having adhesion to the positive-electrode lead 223 and the negative-electrode lead 225, e.g., a polyolefin resin such as polyethylene, polypropylene, denatured polyethylene, and denatured polypropylene.

Next, some applications of the nonaqueous secondary battery (specifically, the lithium ion secondary battery) will be described specifically. Note that the configurations of the applications described as follows are mere examples and can be changed appropriately.

A battery pack, which is a simple battery pack (so-called soft pack) using one nonaqueous secondary battery of the present disclosure, is mounted in an electronic apparatus represented by a smartphone, for example. Alternatively, a battery pack includes an assembled battery constituted by six nonaqueous secondary batteries of the present disclosure connected to have 2 parallel 3 series arrangement. The connection style of the nonaqueous secondary batteries may be series, parallel, or a combination thereof.

Figure 9:
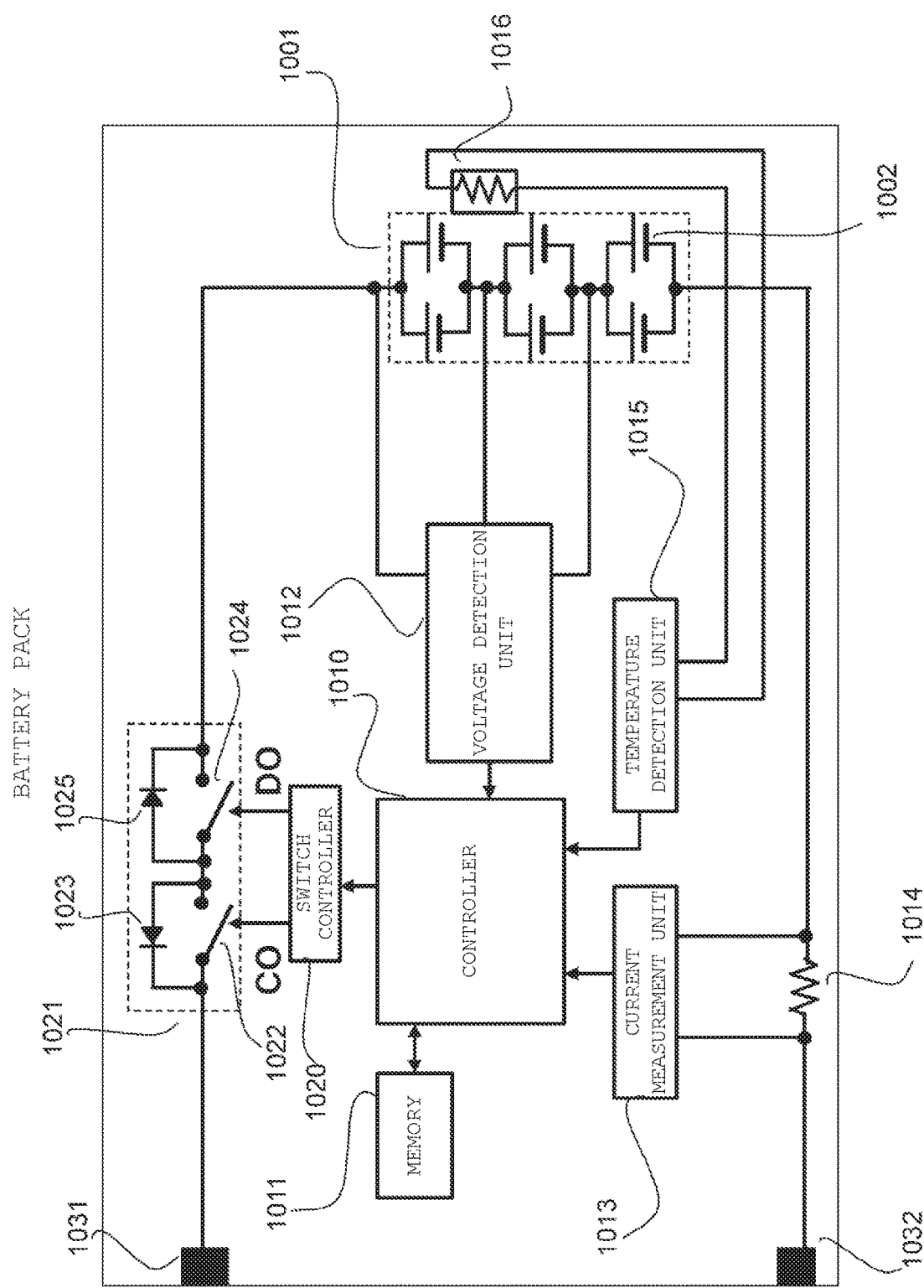
FIG. 9 is a block diagram showing a circuit structure example of a battery pack according to an embodiment of the present technology.

FIG. 9 is a block diagram showing an example circuit configuration in an application of the nonaqueous secondary battery of the present disclosure to a battery pack. The battery pack includes a cell (assembled battery) 1001, an exterior member, a switch unit 1021, a current detection resistor 1014, a temperature detection element 1016, and a controller 1010. The switch unit 1021 includes a charge control switch 1022 and a discharge control switch 1024. The battery pack also includes a positive-electrode terminal 1031 and a negative-electrode terminal 1032. During charging, the positive-electrode terminal 1031 and the negative-electrode terminal 1032 are respectively connected to a positive-electrode terminal and a negative-electrode terminal of a charger, to perform charging. During use of an electronic apparatus, the positive-electrode terminal 1031 and the negative-electrode terminal 1032 are respectively connected to a positive-electrode terminal 1031 and a negative-electrode terminal 1032 of the electronic apparatus, to perform discharging.

The cell 1001 is constituted by a plurality of nonaqueous secondary batteries 1002 of the present disclosure connected in series and/or in parallel. Note that, while six lithium ion secondary batteries 1002 are connected in 2 parallel 3 series (2P3S) arrangement in FIG. 9, any other connection method, like p parallel q series arrangement (where p and q are integers), may be used.

The switch unit 1021 includes the charge control switch 1022 and a diode 1023 and the discharge control switch 1024 and a diode 1025, and is controlled by the controller 1010. The diode 1023 has a polarity reverse with respect to a charge current flowing in the direction from the positive-electrode terminal 1031 to the cell 1001 and forward with respect to a discharge current flowing in the direction from the negative-electrode terminal 1032 to the cell 1001. The diode 1025 has a polarity forward with respect to the charge current and reverse with respect to the discharge current. Note that, while the switch unit is provided on the plus (+) side in the example shown in FIG. 9, it may be provided on the minus (−) side. The charge control switch 1022 is put into the shutoff state when the battery voltage becomes an overcharge detection voltage, under control of the controller 1010, so as not to allow the charge current to flow to the current path of the cell 1001. After the charge control switch 1022 is put into the shutoff state, only discharge is allowed via the diode 1023. Also, the charge control switch 1022 is put into the shutoff state when a high current flows during charging, under control of the controller 1010, so as to shut off the charge current flowing to the current path of the cell 1001. The discharge control switch 1024 is put into the shutoff state when the battery voltage becomes an overdischarge detection voltage, under control of the controller 1010, so as not to allow the discharge current to flow to the current path of the cell 1001. After the discharge control switch 1024 is put into the shutoff state, only charge is allowed via the diode 1025. Also, the discharge control switch 1024 is put into the shutoff state when a high current flows during discharging, under control of the controller 1010, so as to shut off the discharge current flowing to the current path of the cell 1001.

The temperature detection element 1016, made of a thermistor, for example, is provided near the cell 1001. A temperature measurement unit 1015 measures the temperature at the cell 1001 using the temperature detection element 1016 and sends the measured results to the controller 1010. A voltage measurement unit 1012 measures the voltage of the cell 1001 and the voltages of the lithium ion secondary batteries 1002 constituting the cell 1001, A/D converts the measured results, and sends the converted results to the controller 1010. A current measurement unit 1013 measures the current using the current detection resistor 1014 and sends the measured results to the controller 1010.

A switch controller 1020 controls the charge control switch 1022 and the discharge control switch 1024 of the switch unit 1021 based on the voltages and currents sent from the voltage measurement unit 1012 and the current measurement unit 1013. The switch controller 1020 sends control signals to the switch unit 1021 when any of the voltages of the lithium ion secondary batteries 1002 becomes the overcharge detection voltage or overdischarge detection voltage or lower, or when a high current flows rapidly, to prevent overcharge, overdischarge, and overcurrent charge/discharge. Each of the charge control switch 1022 and the discharge control switch 1024 can be constituted by a semiconductor switch such as a MOSFET, for example. In this case, the diodes 1023 and 1025 are each constituted by a MOSFET parasitic diode. When a p-channel FET is used as the MOSFET, the switch controller 1020 feeds a control signal CO and a control signal DO to the gates of the charge control switch 1022 and the discharge control switch 1024, respectively. Each of the charge control switch 1022 and the discharge control switch 1024 is turned on with a gate potential lower than its source potential by a predetermined value or more. That is, in the normal charge and discharge operations, the control signal CO and the control signal DO are put in a low level to keep the charge control switch 1022 and the discharge control switch 1024 in their ON states. At the time of overcharge or overdischarge, for example, the control signal CO and the control signal DO are changed to a high level to change the charge control switch 1022 and the discharge control switch 1024 to the shutoff state.

A memory 1011 is made of an erasable programmable read only memory (EPROM) that is a nonvolatile memory, for example. In the memory 1011, previously stored are numeric values obtained by computation in the controller 1010, internal resistance values of the lithium ion secondary batteries 1002 in their initial states measured at the manufacturing stage, etc. These values are rewritable appropriately. Also, the full charge capacities of the lithium ion secondary batteries 1002 may be previously stored, to enable calculation of the remaining capacities, for example, in cooperation with the controller 1010.

The temperature measurement unit 1015 measures the temperature using the temperature detection element 1016, to perform charge/discharge control at the time of abnormal heating, and performs correction in the calculation of remaining capacities.

Figure 10A:
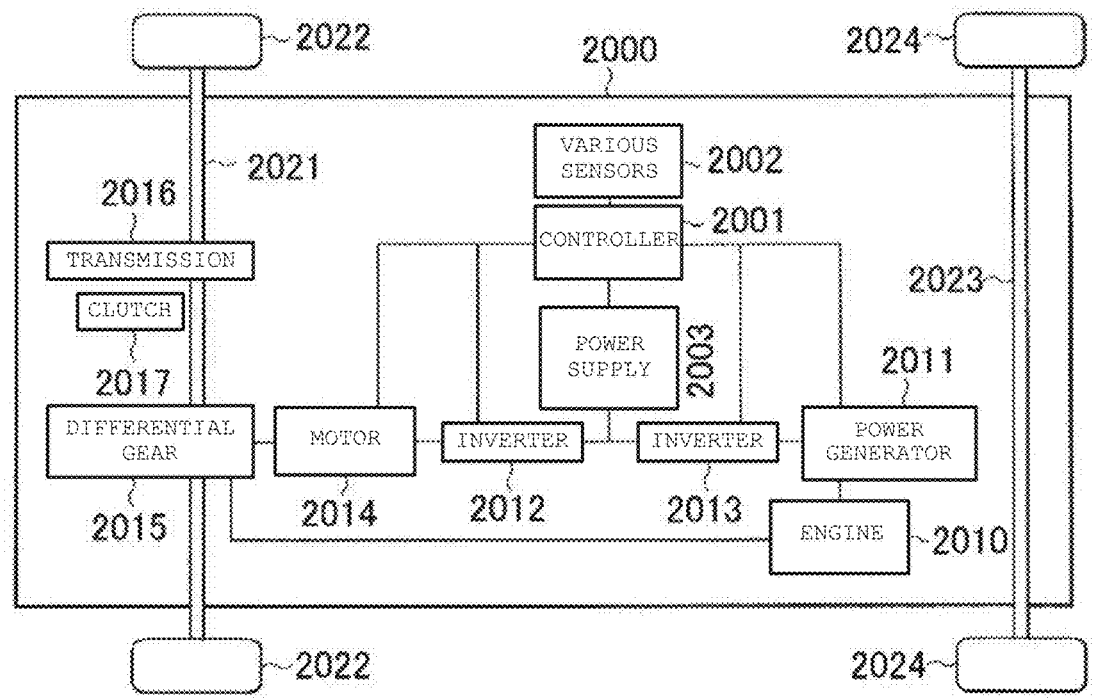
FIGS. 10A, 10B, and 10C are respectively a block diagram representing a structure of an application (an electrically-driven vehicle) of the present disclosure according to an embodiment of the present technology, a block diagram representing a structure of an application (a power storage system) of the present disclosure according to an embodiment of the present technology, and a block diagram representing a structure of an application (an electric tool) of the present disclosure according to an embodiment of the present technology.

Next, FIG. 10A is a block diagram showing a configuration of an electrically-driven vehicle such as a hybrid car that is an example of electrically-driven vehicles. The electrically-driven vehicle includes, inside a metal chassis 2000, a controller 2001, various sensors 2002, a power supply 2003, an engine 2010, a power generator 2011, inverters 2012 and 2013, a motor 2014 for driving, a differential gear 2015, a transmission 2016, and a clutch 2017. The electrically-driven vehicle also includes a front wheel drive axis 2021, front wheels 2022, a rear wheel drive axis 2023, and rear wheels 2024 connected to the differential gear 2015 and the transmission 2016.

The electrically-driven vehicle can run using either the engine 2010 or the motor 2014 as the driving source. The engine 2010, which is a major power source, is a gasoline engine, for example. When the engine 2010 is used as the power source, the driving force (rotative force) of the engine 2010 is transmitted to the front wheels 2022 or the rear wheels 2024 via the differential gear 2015, the transmission 2016, and the clutch 2017 that constitute the drive unit. The rotative force of the engine 2010 is also transmitted to the power generator 2011, which generates AC power using the rotative force. The AC power is converted to DC power via the inverter 2013 and stored in the power supply 2003. Meanwhile, when the motor 2014 as a conversion unit is used as the power source, electric power (DC power) supplied from the power supply 2003 is converted to AC power via the inverter 2012, and the motor 2014 is driven using the AC power. The driving force (rotative force) converted from the electric power by the motor 2014 is transmitted to the front wheels 2022 or the rear wheels 2024 via the differential gear 2015, the transmission 2016, and the clutch 2017 that constitute the drive unit.

When the electrically-driven vehicle slows down its speed via a braking mechanism not shown, the resistive force at the slowdown is transmitted to the motor 2014 as rotative force. Using this rotative force, the motor 2014 may be made to generate AC power. The AC power is converted to DC power via the inverter 2012, and the DC regenerative power is stored in the power supply 2003.

The controller 2001 controls the operation of the entire electrically-driven vehicle, and includes a CPU, for example. The power supply 2003 includes one or a plurality of lithium ion secondary batteries (not shown) described in Example 1. The power supply 2003 is connected to an external power supply, and can be configured to store electric power by receiving electric power from the external power supply. The various sensors 2002 are used for controlling the number of revolutions of the engine 2010 and also for controlling the opening of a throttle valve not shown (throttle opening). The various sensors 2002 include a speed sensor, an acceleration sensor, and an engine RPM sensor, etc., for example.

While the case that the electrically-driven vehicle was a hybrid car was described, the electrically-driven vehicle may also be a vehicle running using only the power supply 2003 and the motor 2014 without use of the engine 2010 (electric car).

Figure 10B:
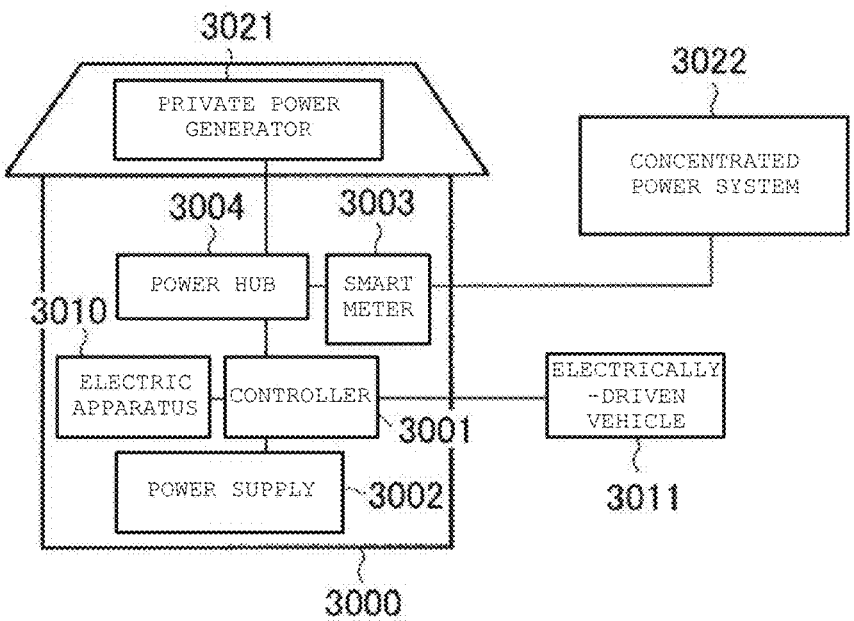

Next, FIG. 10B is a block diagram showing a configuration of a power storage system (power supply system). The power storage system includes, inside a house 3000 such as a general home and a commercial building, a controller 3001, a power supply 3002, a smart meter 3003, and a power hub 3004.

The power supply 3002 is connected to an electric apparatus (electronic apparatus) 3010 placed inside the house 3000, for example, and is also connectable to an electrically-driven vehicle 3011 parking outside the house 3000. Also, the power supply 3002 is connected to a private power generator 3021 placed at the house 3000, for example, via the power hub 3004, and is connectable to an external concentrated power system 3022 via the smart meter 3003 and the power hub 3004. The electric apparatus (electronic apparatus) 3010 includes one or a plurality of home appliances, for example. Examples of the home appliances include a refrigerator, an air conditioner, a TV receiver, and a water heater. The private power generator 3021 is constituted by a solar power generator, a wind power generator, etc., for example. Examples of the electrically-driven vehicle 3011 include an electric car, a hybrid car, an electric motorcycle, an electric bicycle, and a Segway (registered trademark). Examples of the concentrated power system 3022 include, but are not limited to, a commercial power supply, a power generator, a power transmission network, and a smart grid (next-generation power transmission network), and also include a thermal power plant, a nuclear power plant, a hydro power plant, and a wind power plant. Examples of a power generator provided in the concentrated power system 3022 include, but are not limited to, various solar cells, fuel cells, a wind power generator, a micro hydro power generator, and a geothermal power generator.

The controller 3001 controls the operation of the entire power storage system (including the use state of the power supply 3002), and includes a CPU, for example. The power supply 3002 includes one or a plurality of lithium ion secondary batteries (not shown) described in Example 1. The smart meter 3003 is a network correspondence type power meter placed on the house 3000 on the power demand side, for example, and can communicate with the power supply side. The smart meter 3003 controls the demand/supply balance in the house 3000 while communicating with the outside, for example, thereby permitting efficient, stable energy supply.

In this power storage system, electric power is stored into the power supply 3002 from the concentrated power system 3022 as an external power supply via the smart meter 3003 and the power hub 3004, and also electric power is stored into the power supply 3002 from the private power generator 3021 as an independent power supply via the power hub 3004, for example. The electric power stored in the power supply 3002 is supplied to the electric apparatus (electronic apparatus) 3010 and the electrically-driven vehicle 3011 according to an instruction from the controller 3001, thereby permitting actuation of the electric apparatus (electronic apparatus) 3010 and also charging of the electrically-driven vehicle 3011. That is, the power storage system is a system that permits storage and supply of electric power in the house 3000 using the power supply 3002.

The electric power stored in the power supply 3002 can be used arbitrarily. It is therefore possible to store electric power into the power supply 3002 from the concentrated power system 3022 late at night when the electricity rate is low and use the stored electric power during daylight when the electricity rate is high, for example.

The power storage system described above may be placed for each house (each family) or placed every plural houses (plural families).

Figure 10C:
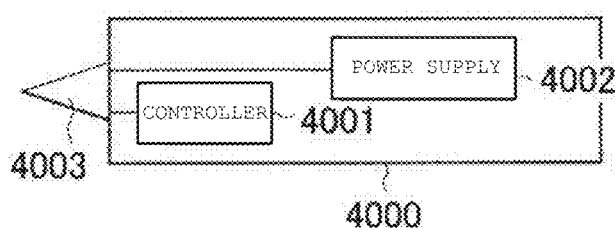

Next, FIG. 10C is a block diagram showing a configuration of an electric tool. The electric tool is an electric drill, for example, and includes a controller 4001 and a power supply 4002 inside a tool body 4000 made of a plastic material, etc. A drill unit 4003, for example, as a movable unit is rotatably attached to the tool body 4000. The controller 4001 controls the operation of the entire electric tool (including the use state of the power supply 4002), and includes a CPU, etc., for example. The power supply 4002 includes one or a plurality of lithium ion secondary batteries (not shown) described in Example 1. The controller 4001 supplies electric power from the power supply 4002 to the drill unit 4003 according to the manipulation of an operation switch not shown.

While the present disclosure was described based on preferred examples, it is not limited to these examples. It is to be understood that the composition of the negative-electrode active material, the raw material used in the manufacture, the manufacturing method, the manufacturing conditions, the properties of the negative-electrode active material, and the configuration and structure of the nonaqueous secondary battery described in the examples are merely illustrative and by no means restrict the present disclosure, and also can be changed appropriately.

The present technology is described below in further detail according to an embodiment.

[A01]<Negative-Electrode Active Material>

A negative-electrode active material constituted by a particle containing:

a core; and a coat layer coating at least a part of the surface of the core, wherein the core is made of a nickel silicide-based material and a silicon oxide-based material, and the coat layer is made of a nickel silicate-based material.

[A02] The negative-electrode active material of [A01], wherein the nickel silicide-based material constituting the core is made of $Ni_XSi$ (where $0<X<2$), the silicon oxide-based material constituting the core is made of $Ni_YSiO_Z$ (where $0<Y<1$ and $0<Z<3$), and the nickel silicate-based material constituting the coat layer is made of $Ni_USiO_V$ (where $1 \leq U \leq 2$ and $3 \leq V \leq 4$).

[A03] The negative-electrode active material of [A01] or [A02], wherein the core has a sea-island structure, the nickel silicide-based material corresponds to the island, and the silicon oxide-based material corresponds to the sea.

[A04] The negative-electrode active material of any one of [A01] to [A03], wherein the coat layer coats an entire surface of the core.

[A05] The negative-electrode active material of any one of [A01] to [A04], constituting a negative-electrode active material for a nonaqueous secondary battery.

[A06] The negative-electrode active material of any one of [A01] to [A05], wherein the nickel silicide-based material takes up 10 parts by mass to 90 parts by mass with respect to 100 parts by mass of the core.

[A07] The negative-electrode active material of any one of [A01] to [A06], wherein the core takes up 50 parts by mass to 99.9 parts by mass with respect to 100 parts by mass of the negative-electrode active material.

[B01]<Nonaqueous Secondary Battery>

A nonaqueous secondary battery including a negative electrode having a negative-electrode active material, wherein the negative-electrode active material is constituted by a particle containing:
a core; and
a coat layer coating at least part of the surface of the core,
the core being made of a nickel silicide-based material and a silicon oxide-based material, and
the coat layer being made of a nickel silicate-based material.

[B02]<Nonaqueous Secondary Battery>

A Nonaqueous secondary battery including a negative electrode having a negative-electrode active material, wherein the negative-electrode active material is the negative-electrode active material of any one of [A01] to [A07].

[C01]<Method of Manufacturing a Negative-Electrode Active Material>

A method of manufacturing a negative-electrode active material, the negative-electrode active material being constituted by a particle containing:
a core; and
a coat layer coating at least part of the surface of the core,
the core being made of a nickel silicide-based material and a silicon oxide-based material, and
the coat layer being made of a nickel silicate-based material, the method including:
mixing a solution containing nickel and a silicon oxide particle, drying the mixture, and then being subjected the mixture to heat-treatment in a reduction atmosphere.

[C02]<Method of Manufacturing a Negative-Electrode Active Material>

A method of manufacturing the negative-electrode active material of any one of [A01] to [A07], the method including:
mixing a solution containing nickel and a silicon oxide particle, drying the mixture, and then being subjected the mixture to heat-treatment in a reduction atmosphere.

[C03] The method of [C01] or [C02], wherein the solution containing nickel includes nickel acetate salt.

[C04] The method of any one of [C01] to [C03], wherein the heat-treatment is performed at 600° C. to 1000° C. for one hour or longer.

[C05] The method of any one of [C01] to [C04], wherein the reduction atmosphere is an inactive gas atmosphere containing hydrogen gas.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative-electrode active material comprising a particle including:
a core; and
a coat layer provided on at least a part of a surface of the core,
wherein the core includes a first nickel silicide-based material and a silicon oxide-based material, and
wherein the coat layer includes a second nickel silicate-based material.

2. The negative-electrode active material according to claim 1, wherein
the first nickel silicide-based material includes $Ni_XSi$ (where $0<X\leq2$),
the silicon oxide-based material includes $Ni_YSiO_Z$ (where $0<Y<1$ and $0<Z<3$), and
the second nickel silicate-based material includes $Ni_USiO_V$ (where $1\leq U\leq2$ and $3\leq V\leq4$).

3. The negative-electrode active material according to claim 1, wherein
the core includes a sea-island structure,
the first nickel silicide-based material corresponds to an island of the sea-island structure, and
the silicon oxide-based material corresponds to a sea of the sea-island structure.

4. The negative-electrode active material according to claim 1, wherein the coat layer is provided on an entire surface of the core.

5. The negative-electrode active material according to claim 1, wherein the negative-electrode active material is configured to be used in a nonaqueous secondary battery.

6. The negative-electrode active material according to claim 1, wherein the first nickel silicide-based material is from 10 parts by mass to 90 parts by mass with respect to 100 parts by mass of the core.

7. The negative-electrode active material according to claim 1, wherein the core is from 50 parts by mass to 99.9 parts by mass with respect to 100 parts by mass of the negative-electrode active material.

8. A nonaqueous secondary battery comprising a negative electrode including a negative-electrode active material, wherein
the negative-electrode active material includes a particle including:
a core; and
a coat layer provided on at least a part of a surface of the core,
wherein the core includes a first nickel silicide-based material and a silicon oxide-based material, and
wherein the coat layer includes a second nickel silicate-based material.

9. An electric vehicle comprising:
the nonaqueous secondary battery according to claim 8;
a converter configured to convert an electric power supplied from the secondary battery to a driving force;
a driver configured to drive in response to the driving force; and
a controller configured to control an operation of the secondary battery.

10. A power storage system comprising:
the nonaqueous secondary battery according to claim 8,
at least an electric device to which an electric power is configured to be supplied from the nonaqueous secondary battery; and
a controller configured to control the supply of an electric power from the nonaqueous secondary battery to the electric device.

11. An electric tool comprising:
the nonaqueous secondary battery according to claim 8; and
a movable unit to which an electric power is configured to be supplied from the nonaqueous secondary battery.

12. A method of manufacturing a negative-electrode active material, wherein the negative-electrode active material includes a particle including:
a core; and
a coat layer provided on at least a part of a surface of the core, wherein the core includes a first nickel silicide-based material and a silicon oxide-based material, and wherein the coat layer includes a second nickel silicate-based material, the method comprising mixing a solution including nickel and a silicon oxide particle, drying the mixture, and performing heat-treatment to the mixture in a reduction atmosphere.

13. The method according to claim 12, wherein the solution includes nickel including nickel acetate salt.

14. The method according to claim 12, wherein the heat-treatment is performed at 600° C. to 1000° C. for one hour or longer.

15. The method according to claim 12, wherein the reduction atmosphere is an inactive gas atmosphere including hydrogen gas.

* * * * *